(12) United States Patent
Miyata

(10) Patent No.: US 9,697,777 B2
(45) Date of Patent: Jul. 4, 2017

(54) LIQUID CRYSTAL DISPLAY DEVICE

(71) Applicant: Sharp Kabushiki Kaisha, Osaka-shi, Osaka (JP)

(72) Inventor: Hidekazu Miyata, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 144 days.

(21) Appl. No.: 14/436,147

(22) PCT Filed: Dec. 13, 2013

(86) PCT No.: PCT/JP2013/083433
§ 371 (c)(1),
(2) Date: Apr. 16, 2015

(87) PCT Pub. No.: WO2014/097976
PCT Pub. Date: Jun. 26, 2014

(65) Prior Publication Data
US 2015/0302805 A1    Oct. 22, 2015

(30) Foreign Application Priority Data

Dec. 21, 2012 (JP) .................................. 2012-280180

(51) Int. Cl.
*G09G 3/34* (2006.01)
*G09G 3/36* (2006.01)
(Continued)

(52) U.S. Cl.
CPC ......... *G09G 3/3413* (2013.01); *G02B 6/0041* (2013.01); *G02B 6/0046* (2013.01);
(Continued)

(58) Field of Classification Search
CPC ............... G02B 6/0041; G02B 6/0046; G02B 2027/0112; G02B 6/0068; G02B 6/0076;
(Continued)

(56) References Cited

U.S. PATENT DOCUMENTS 8,033,706 B1 * 10/2011 Kelly .................. G02B 6/0036
362/307
2006/0056166 A1 * 3/2006 Yeo ...................... G02B 6/0041
362/19
(Continued)

FOREIGN PATENT DOCUMENTS

JP       2012-109227 A     6/2012
JP       2012-119311 A     6/2012

*Primary Examiner* — Alexander Eisen
*Assistant Examiner* — Abhishek Sarma
(74) *Attorney, Agent, or Firm* — Keating & Bennett, LLP

(57) ABSTRACT

In a liquid crystal display device capable of performing image display while keeping a background in a transparent state, field-sequential driving is performed without causing color mixing.

A backlight (700) is configured by upper-side LEDs (71U) and lower-side LEDs (71D) that are provided respectively in an upper side and a lower side of a liquid crystal panel (800), and an upper-side light guide plate (72U) and a lower-side light guide plate (72D) for guiding emission light respectively from the upper-side LEDs (71U) and the lower-side LEDs (71D) to the liquid crystal panel (800). When a screen of a color corresponding to each field which constitutes one frame period is displayed, LEDs included in the upper-side LEDs (71U) are turned into a light emission state and then LEDs included in the lower-side LEDs (71D) are turned into the light emission state, and the LEDs included in the upper-side LEDs (71U) are turned into a light-off state and then the LEDs included in the lower-side LEDs (71D) are turned into the light-off state.

12 Claims, 29 Drawing Sheets

(51) Int. Cl.
  *F21V 8/00* (2006.01)
  *G02B 27/01* (2006.01)
  *G02F 1/133* (2006.01)
  *G02F 1/1335* (2006.01)

(52) U.S. Cl.
  CPC ......... *G02B 6/0068* (2013.01); *G02B 6/0076* (2013.01); *G02B 27/0101* (2013.01); *G02F 1/13306* (2013.01); *G09G 3/3648* (2013.01); *G02B 2027/0112* (2013.01); *G02F 1/133615* (2013.01); *G09G 2310/0235* (2013.01); *G09G 2310/0237* (2013.01); *G09G 2320/0233* (2013.01); *G09G 2320/0242* (2013.01)

(58) Field of Classification Search
  CPC ....... G02B 27/0101; G09G 2320/0233; G09G 2310/0235; G09G 2320/0242; G09G 3/3648; G09G 2310/0237; G09G 3/3413; G02F 1/13306; G02F 1/133615
  See application file for complete search history.

(56) References Cited

U.S. PATENT DOCUMENTS

| | | | |
|---|---|---|---|
| 2007/0052662 A1* | 3/2007 | Kim | G02F 1/133605 345/102 |
| 2009/0058794 A1* | 3/2009 | Iwamoto | G09G 3/18 345/102 |
| 2009/0262065 A1* | 10/2009 | Shin | G09G 3/3406 345/102 |
| 2011/0007524 A1* | 1/2011 | Nagatani | G02B 6/0061 362/616 |
| 2012/0099293 A1 | 4/2012 | Miyairi | |
| 2012/0120677 A1 | 5/2012 | Miyairi et al. | |
| 2012/0176812 A1* | 7/2012 | Hwang | G02B 5/0278 362/606 |
| 2012/0206321 A1* | 8/2012 | Lee | G02B 6/0055 345/5 |

* cited by examiner

← UPPER PART SIDE OF PANEL

← LOWER PART SIDE OF PANEL

← UPPER PART SIDE OF PANEL

← LOWER PART SIDE OF PANEL

LIQUID CRYSTAL DISPLAY DEVICE

TECHNICAL FIELD

The present invention relates to a liquid crystal display device, and in particular relates to a liquid crystal display device allowing a far side of a screen to be seen.

BACKGROUND ART

In general, in a liquid crystal display device which performs color display, one pixel is divided into three sub-pixels of a red color pixel in which a color filter that transmits red color light is provided, a green color pixel in which a color filter that transmits green color light is provided, and a blue color pixel in which a color filter which transmits blue color light is provided. The color display is enabled by color filters provided in these three sub-pixels, but about two thirds of backlight light which is irradiated to a liquid crystal panel is absorbed by the color filters. Therefore, a liquid crystal display device of a color filter system has a problem that light use efficiency is low. Thus, a liquid crystal display device which adopts field-sequential driving that performs color display without using the color filters is being focused.

In a general liquid crystal display device which adopts the field-sequential driving, a display period of one screen (one frame period) is divided into three fields (first to third fields). Note that, although the field is also referred to as a sub-frame, the term of the field is consistently used in the following description. For example, a red color screen is displayed based on a red color component of an input signal in the first field, a green color screen is displayed based on a green color component of the input signal in the second field, and a blue color screen is displayed based on a blue color component of the input signal in the third field. By displaying the primary colors one by one as described above, a color image is displayed in a liquid crystal panel. Because display of the color image is performed in this manner, a color filter is unnecessary in the liquid crystal display device that adopts the field-sequential driving. Thereby, light use efficiency in the liquid crystal display device which adopts the field-sequential driving becomes about three times compared with the liquid crystal display device of the color filter system.

Meanwhile, in a liquid crystal display device of an active matrix type, generally, a plurality of gate bus lines (scanning signal lines) provided in a liquid crystal panel are driven one by one sequentially. Therefore, writing (charging) of a pixel on an upper part of a panel to a pixel capacitance is performed near a start of each field, writing (charging) of a pixel on a center part of the panel to the pixel capacitance is performed about in the middle of each field, and writing (charging) of a pixel on a lower part of the panel to the pixel capacitance is performed near an end of each field. Accordingly, when the field-sequential driving is adopted, it is necessary to cause a backlight to emit light in synchronization with scanning being performed sequentially from the upper part of the panel to the lower part of the panel. Note that, the processing for causing the backlight to emit light sequentially from the upper part of the panel to the lower part of the panel is referred to as "backlight scanning" below.

An invention of a display device that performs backlight scanning is disclosed, for example, in following literatures. Japanese Unexamined Patent Application Publication No. 2012-109227 discloses an invention of a display device that performs backlight scanning by using a direct-type backlight. Further, Japanese Unexamined Patent Application Publication No. 2012-119311 discloses an invention of a display device that performs backlight scanning by using an edge-light type (side-light type) backlight.

CITATION LIST

Patent Literatures

PTL 1: Japanese Unexamined Patent Application Publication No. 2012-109227
PTL 2: Japanese Unexamined Patent Application Publication No. 2012-119311

SUMMARY OF INVENTION

Technical Problem

These days, a display device capable of performing image display while keeping a background in a transparent state (display device allowing a far side of a screen to be seen) is being developed. Such a display device is called "a see-through display", "a transparent display" or the like. In the see-through display, a display unit needs to be transparent. Therefore, when the field-sequential driving is adopted in the see-through display, it is impossible to adopt a configuration that backlight scanning is performed by using a direct-type backlight (configuration disclosed in Japanese Unexamined Patent Application Publication No. 2012-109227). Further, according to the configuration disclosed in Japanese Unexamined Patent Application Publication No. 2012-119311, backlight scanning by using the edge-light type backlight is realized by providing a reflection wall on a back face of a panel, but it is impossible to make the display unit transparent because the reflection wall is provided.

Here, description will be given for a conventional method when the field-sequential driving is performed by using an edge-light type backlight (hereinafter, referred to as a "first method"). Note that, it is set that an LED (light emitting diode) is adopted as a backlight light source. In the first method, one frame period is divided into a first field for displaying a red color screen, a second field for displaying a green color screen, and a third field for displaying a blue color screen as shown in FIG. 28. In FIG. 28, a high part of each waveform represents a "light emission state" and a low part of each waveform represents a "light-off state" (which are same also in FIG. 10, FIG. 23, FIG. 25, FIG. 27 and FIG. 39). In the first field, all LEDs of red color are in the light emission state (light-on states) through one field period. In the second field, all LEDs of green color are in the light emission state through one field period. In the third field, all LEDs of blue color are in the light emission state through one field period. In such a configuration, when a target display image is an image as shown in FIG. 11, a target display image in the first field is an image as shown in FIG. 12, a target display image in the second field is an image as shown in FIG. 13, and a target display image in the third field is an image as shown in FIG. 14.

In the meantime, it requires from about several milliseconds to ten and several milliseconds before a target transmittance is reached after voltage is applied to a liquid crystal in each pixel. When considering this point and a point that gate bus lines are driven one by one sequentially, display image at each time point during one frame period (refer to FIG. 28) is as follows in the first method. In the first field, the display images at a time point t81, a time point t82 and a time point t83 are images as shown in FIG. 29, FIG. 30 and FIG. 31, respectively. In the second field, the display images at a time point t84, a time point t85 and a time point t86 are images as shown in FIG. 32, FIG. 33 and FIG. 34, respectively. In the third field, the display images at a time point t87, a time point t88 and a time point t89 are images as shown in FIG. 35, FIG. 36 and FIG. 37, respectively. As a result of this, with the first method, an image which is viewed by human eyes is an image in which color mixing occurs as shown in FIG. 38. Note that, in this specification, the color mixing means that lights of different colors are mixed unnecessarily.

In order to suppress the occurrence of color mixing as described above, proposed is a method for causing an LED to emit light only in a partial period of a latter half in each field (hereinafter, referred to as a "second method") is proposed. For example, as shown in FIG. 39, the LED is turned into the light emission state only in the last quarter period of each field. At this time, luminance of the LED is a quadruple of normal luminance. In the second method like this, display images at each time point during one frame period (refer to FIG. 39) are as follows. In the first field, the display images at a time point t91 and a time point t92 are images as shown in FIG. 40 and FIG. 41, respectively. In the second field, the display images at a time point t93 and a time point t94 are images as shown in FIG. 40 and FIG. 42, respectively. In the third field, the display images at a time point t95 and a time point t96 are images as shown in FIG. 40 and FIG. 43, respectively. As a result of this, with the second method, an image which is viewed by human eyes is an image in which color mixing occurs in a lower part of a panel as shown in FIG. 44.

Further, a method for delaying a period in which the LED is turned into the light emission state by a predetermined period compared with the second method (hereinafter, referred to as a "third method") is considered. For example, it is considered to delay the period in which the LED is turned into the light emission state by one eighth field compared with the example shown in FIG. 39. With the third method like this, however, color mixing occurs in an upper part of the panel and a lower part of the panel as shown in FIG. 45. That is, color mixing is not eliminated.

Furthermore, a method for making a length of a period for writing to a pixel capacitance (charging period) a half of a conventional one (hereinafter, referred to as a "fourth method") is proposed. In the liquid crystal display device which adopts the field-sequential driving, however, a length of a period for writing becomes one third compared with the liquid crystal display device of the color filter system. Therefore, with the fourth method, the length of the period for writing becomes one sixth compared with the liquid crystal display device of the color filter system. For realizing it, a liquid crystal panel is required to have capability of writing to the pixel capacitance with a frequency of 360 Hz, but the realization is not easy at present. That is, it is not easy to realize the fourth method.

Thus, the present invention aims to perform field-sequential driving without causing color mixing in a liquid crystal display device capable of performing image display while keeping a background in a transparent state.

Solution to Problem

A first aspect of the present invention is a liquid crystal display device, comprising a liquid crystal panel in which a plurality of video signal lines and a plurality of scanning signal lines are disposed and which is capable of displaying an image while keeping a background in a transparent state; a liquid crystal panel driving unit that drives the plurality of video signal lines and the plurality of scanning signal lines; a backlight composed of a plurality of light sources including light sources of K colors (K is an integer of 3 or more) provided on a back face side of the liquid crystal panel; and a backlight driving unit that drives the backlight, for performing display of a color image by dividing one frame period into a plurality of fields and displaying a screen of a different color for each field, in which when one side part and the other side part of the liquid crystal panel in a direction in which the plurality of video signal lines extend are defined as a first side part and a second side part, respectively, the backlight has a first light source group including the light sources of the K colors, which are provided in a vicinity of the first side part among the plurality of light sources, a second light source group including the light sources of the K colors, which are provided in a vicinity of the second side part among the plurality of light sources, a first light guide plate that is configured so that luminance of the liquid crystal panel becomes low gradually as being close to the second side part from the first side part when all light sources included in the first light source group are turned into a light emission state, for guiding light emitted from the light sources included in the first light source group to the liquid crystal panel, and a second light guide plate that is configured so that the luminance of the liquid crystal panel becomes low gradually as being close to the first side part from the second side part when all light sources included in the second light source group are turned into the light emission state, for guiding light emitted from the light sources included in the second light source group to the liquid crystal panel, the liquid crystal panel driving unit drives the plurality of scanning signal lines one by one sequentially from a scanning signal line disposed at a most proximate position to the first side part to a scanning signal line disposed at a most proximate position to the second side part, and the backlight driving unit, when displaying a screen of a color corresponding to each field, turns a light source included in the first light source group into the light emission state and then turns a light source included in the second light source group into the light emission state, and turns the light source included in the first light source group into a light-off state and then turns the light source included in the second light source group into the light-off state, and when an arbitrary field of the plurality of fields is defined as a focused field and a light source that is to be turned into the light emission state for displaying a screen of a color corresponding to the focused field is defined as an objective light source, the backlight driving unit turns the objective light source included in the first light source group into the light emission state at a timing of tu-s obtained by a following formula (A), turns the objective light source included in the first light source group into the light-off state at a timing of tu-e obtained by a following formula (B), turns the objective light source included in the second light source group into the light emission state at a timing of td-s obtained by a following formula (C), and turns the objective light source included in the second light source group into the light-off state at a timing of td-e obtained by a following formula (D), with a start time point of the focused field as a reference:

$$tu(s) = f - fa + res - ft \quad (A)$$

$$tu(e) = f - fa + res \quad (B)$$

$$td(s) = f + fa - ft \quad (C)$$

$$td(e) = f + fa \quad (D)$$

in which, f represents a length of one field period, ft represents a length of a light emission period of each light source, fa represents a time required to drive the scanning signal line included in a low-luminance area having predetermined luminance or less when all light sources included in either the first light source group or the second light source group are turned into the light emission state, and res represents a time required for a liquid crystal to respond sufficiently.

A second aspect of the present invention is characterized in that, in the first aspect of the present invention, when the res is larger than the fa, the backlight driving unit turns the objective light source included in the second light source group into the light emission state at a timing of td-s obtained by a following formula (E) and turns the objective light source included in the second light source group into the light-off state at a timing of td-e obtained by a following formula (F), with the start time point of the focused field as the reference:

$$td(s) = f + res - ft \quad (E)$$

$$td(e) = f + res \quad (F).$$

A third aspect of the present invention is characterized in that, in the first aspect of the present invention, the fa is f/4, the ft is f/4, and the low-luminance area is an area in which the luminance becomes 15% or less of maximum luminance when all the light sources included in either the first light source group or the second light source group are turned into the light emission state.

A fourth aspect of the present invention is characterized in that, in the first aspect of the present invention, the first light guide plate contains a plurality of light diffusion particles having different refractive indexes so that the luminance of the liquid crystal panel becomes low gradually as being close to the second side part from the first side part when all the light sources included in the first light source group are turned into the light emission state, the second light guide plate contains a plurality of light diffusion particles having different refractive indexes so that the luminance of the liquid crystal panel becomes low gradually as being close to the first side part from the second side part when all the light sources included in the second light source group are turned into the light emission state, and the first light guide plate and the second light guide plate are configured so that the luminance becomes uniform over the entire liquid crystal panel when all the light sources included in the first light source group and all the light sources included in the second light source group are turned into the light emission state.

A fifth aspect of the present invention is characterized in that, in the first aspect of the present invention, the light sources of the K colors are light sources of three colors composed of a red color light source, a green color light source and a blue color light source, one frame period is configured by at least three fields including a field corresponding to a red color screen, a field corresponding to a green color screen and a field corresponding to a blue color screen, and the backlight driving unit turns the red color light source into the light emission state when the red color screen is displayed, turns the green color light source into the light emission state when the green color screen is displayed, and turns the blue color light source into the light emission state when the blue color screen is displayed.

Advantageous Effects of Invention

According to the first aspect of the present invention, in a liquid crystal display device which adopts field-sequential driving, the backlight is provided with the light sources of the K colors provided in both of upper and lower sides of the liquid crystal panel (one side in a direction in which the video signal lines extend is set as the upper side and the other side is set as the lower side), the first light guide plate that guides emission light from light sources provided in the upper side of the liquid crystal panel (hereinafter, referred to as "upper-side light sources") to the liquid crystal panel, and the second light guide plate that guides emission light from light sources provided in the lower side of the liquid crystal panel (hereinafter, referred to as "lower-side light sources") to the liquid crystal panel. In such a configuration, for displaying a screen of a color corresponding to each field, first, the upper-side light sources are turned into the light emission state and the lower-side light sources are then turned into the light emission state. At this time, by considering the length of the light emission period of each light source, the time required to drive the scanning signal line in the low-luminance area (the area having predetermined luminance or less when all the light sources included in either the upper-side light sources or the lower-side light sources are turned into the light emission state), and the liquid crystal response time, a light emission timing and a light-off timing for the upper-side light sources, and a light emission timing and a light-off timing for the lower-side light sources are determined. Here, the first light guide plate is configured so that luminance becomes low gradually as being close to a lower part of the panel from an upper part of the panel when the upper-side light sources are turned into the light emission state, and the second light guide plate is configured so that luminance becomes low gradually as being close to the upper part of the panel from the lower part of the panel when the lower-side light sources are turned into the light emission state. Thus, it becomes possible to make the upper part of the panel and the lower part of the panel bright sequentially. That is, it becomes possible to perform backlight scanning in a pseudo manner. Further, as described above, the light sources are provided in both of upper and lower sides of the liquid crystal panel and a constituent element such as a reflection wall does not need to be provided in the liquid crystal panel. Thus, it is possible to make the display unit of the liquid crystal panel transparent. Accordingly, it is possible to perform field-sequential driving while preventing occurrence of color mixing reliably in the liquid crystal display device capable of displaying an image while keeping a background in a transparent state.

According to the second aspect of the present invention, the lower-side light sources are kept in the light emission state until the liquid crystal is turned into a sufficiently responding state in a pixel of a lowest part of the liquid crystal panel. Therefore, luminance and contrast in the lower part of the liquid crystal panel become excellent.

According to the third aspect of the present invention, in the same manner as the first aspect of the present invention, it is possible to perform field-sequential driving while preventing occurrence of color mixing reliably in the liquid crystal display device capable of displaying an image while keeping a background in a transparent state.

According to the fourth aspect of the present invention, by configuring the light guide plates to contain the plurality of light diffusion particles having different refractive indexes, it is possible to perform field-sequential driving without causing luminance non-uniformity or color mixing in the liquid crystal display device capable of displaying an image while keeping a background in a transparent state.

According to the fifth aspect of the present invention, an effect same as that of the first aspect of the present invention is achieved by using general light sources.

DESCRIPTION OF EMBODIMENTS

Description will hereinafter be given for embodiments of the present invention with reference to the accompanying drawings.

<1. First Embodiment>
<1.1 Overall Configuration and Summary of Operation>

Figure 2:
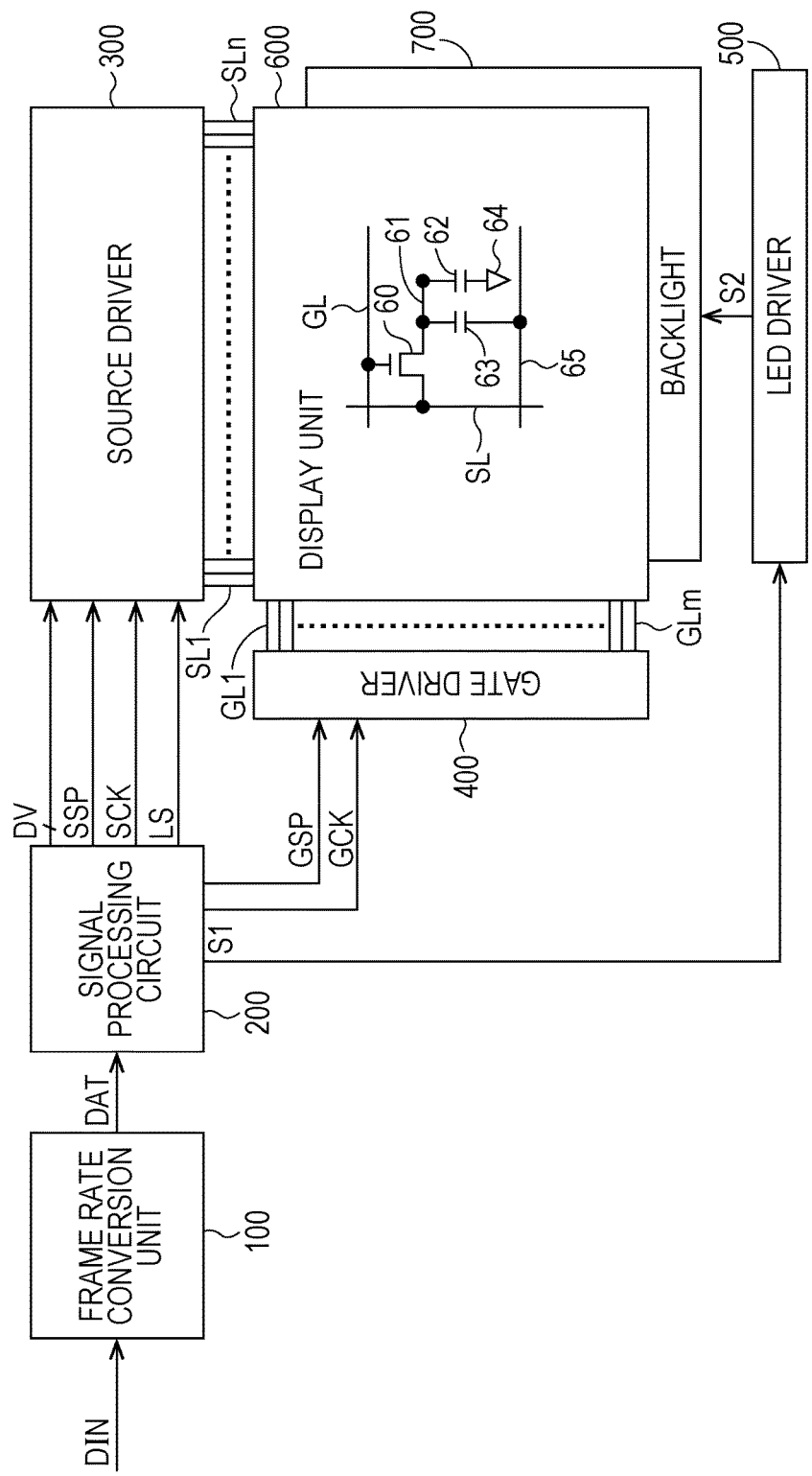
FIG. 2 is a block diagram showing an overall functional configuration of the liquid crystal display device according to the first embodiment.

FIG. 2 is a block diagram showing an overall functional configuration of a liquid crystal display device according to a first embodiment of the present invention. This liquid crystal display device is configured by a frame rate conversion unit 100, a signal processing circuit 200, a source driver 300, a gate driver 400, an LED driver 500, a display unit 600, and a backlight 700. Note that, an LED (light emitting diode) is adopted as a light source for the backlight 700. In the present embodiment, a liquid crystal panel driving unit is realized by the source driver 300 and the gate driver 400, and a backlight driving unit is realized by the LED driver 500.

As to FIG. 2, in the display unit 600, a plurality of (n) source bus lines (video signal lines) SL1 to SLn and a plurality of (m) gate bus lines (scanning signal lines) GL1 to GLm are disposed. Pixel formation units for forming a pixel are provided correspondingly to respective intersections of the source bus lines SL1 to SLn and the gate bus lines GL1 to GLm. That is, the display unit 600 includes a plurality of pixel formation units. The plurality of pixel formation units are arranged in a matrix shape to form a pixel array. Each pixel formation unit includes a TFT 60 which is a switching element that a gate terminal is connected to the gate bus line GL passing through a corresponding intersection and a source terminal is connected to the source bus line SL passing through this intersection, a pixel electrode 61 which is connected to a drain terminal of the TFT 60, a common electrode 64 and an auxiliary capacitance electrode 65 which are provided so as to be shared by the plurality of pixel formation units, a liquid crystal capacitance 62 which is formed by the pixel electrode 61 and the common electrode 64, and an auxiliary capacitance 63 which is formed by the pixel electrode 61 and the auxiliary capacitance electrode 65. A pixel capacitance is configured by the liquid crystal capacitance 62 and the auxiliary capacitance 63. Note that, only a constituent element corresponding to one pixel formation unit is shown in the display unit 600 of FIG. 2.

The frame rate conversion unit 100 converts a frame rate of an input image signal DIN which is given from outside. In the present embodiment, the input image signal DIN of 60 Hz is given to the frame rate conversion unit 100 and data of 180 Hz is output from the frame rate conversion unit 100 as target image data DAT. Accordingly, a frame rate when an image is displayed on the display unit 600 (display frame rate) is 180 Hz. Note that, a specific method for converting the frame rate is not particularly limited.

The signal processing circuit 200 receives target image data DAT transmitted from the frame rate conversion unit 100, and outputs a digital video signal DV; a source start pulse signal SSP, a source clock signal SCK and a latch strobe signal LS for controlling operations of the source driver 300; a gate start pulse signal GSP and a gate clock signal GCK for controlling operations of the gate driver 400; and an LED driver control signal S1 for controlling operations of the LED driver 500.

The source driver 300 receives the digital video signal DV, the source start pulse signal SSP, the source clock signal SCK and the latch strobe signal LS, which are transmitted from the signal processing circuit 200, and applies video signals for driving to each source bus line SL. At this time, in the source driver 300, the digital video signal DV showing voltage to be applied to each source bus line SL is held sequentially at a timing when a pulse of the source clock signal SCK is generated. Then, at a timing when a pulse of the latch strobe signal LS is generated, the digital video signal DV which is held is converted into analogue voltage. This converted analogue voltage is applied to all the source bus lines SL1 to SLn concurrently as the video signals for driving.

The gate driver 400 repeats application of active scanning signals to each of the gate bus lines GL in cycles of one vertical scanning period based on the gate start pulse signal GSP and the gate clock signal GCK, which are transmitted from the signal processing circuit 200.

The LED driver 500 outputs a light source control signal S2 for controlling a state of each LED constituting the backlight 700 based on the LED driver control signal S1 transmitted from the signal processing circuit 200. In the backlight 700, switching of the state of each LED (switching between a light emission state and a light-off state) is performed as appropriate based on the light source control signal S2.

As described above, the video signals for driving are applied to the source bus lines SL1 to SLn, the scanning signals are applied to the gate bus lines GL1 to GLm, and the state of each LED is switched as appropriate, so that an image based on the input image signal DIN is displayed on the display unit 600.

<1.2 Configuration of Backlight>

Figure 1:
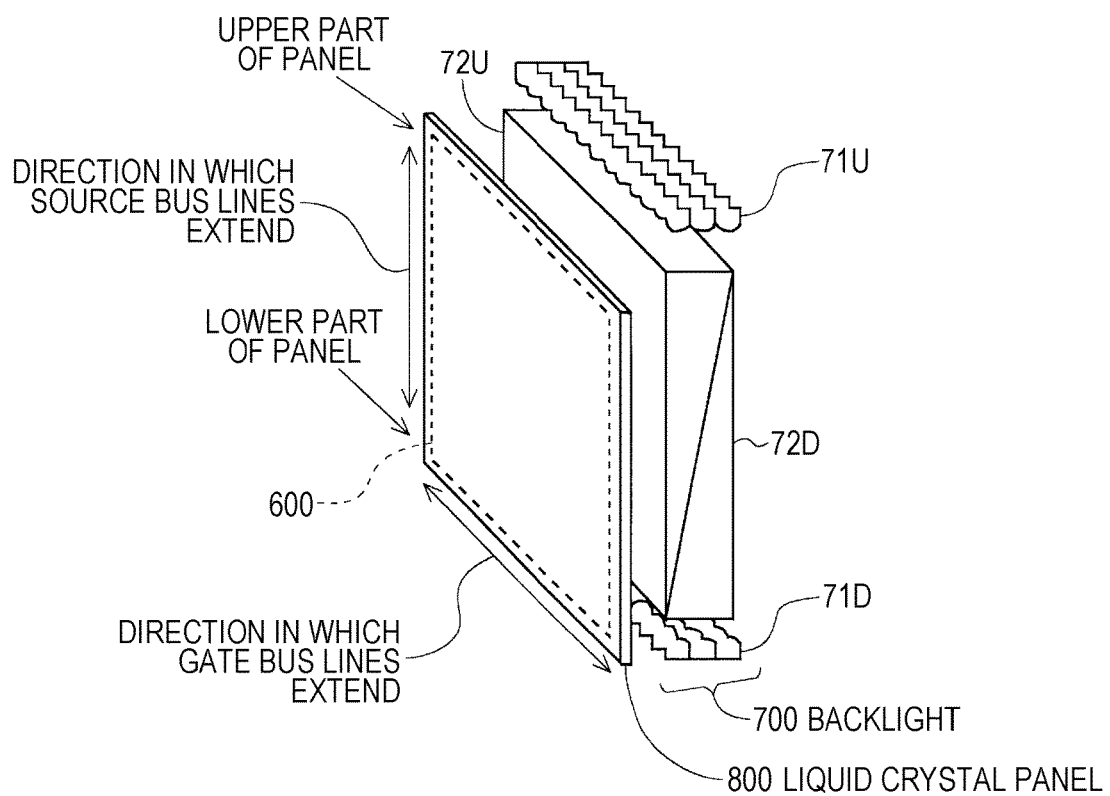
FIG. 1 is a schematic perspective view of a liquid crystal display device for explaining a configuration of a backlight in a first embodiment of the present invention.

Next, description will be given for a configuration of the backlight 700 in the present embodiment. FIG. 1 is a schematic perspective view of the liquid crystal display device for explaining the configuration of the backlight 700 in the present embodiment. This liquid crystal display device is configured by a liquid crystal panel 800 which includes the display unit 600 for displaying an image, and the backlight 700 for irradiating light from a back face of the liquid crystal panel 800 (to this liquid crystal panel 800). Note that, constituent elements for driving the liquid crystal panel 800 and the backlight 700 (for example, a driver IC and a print substrate which incorporates it) are not shown in FIG. 1.

Figure 3:
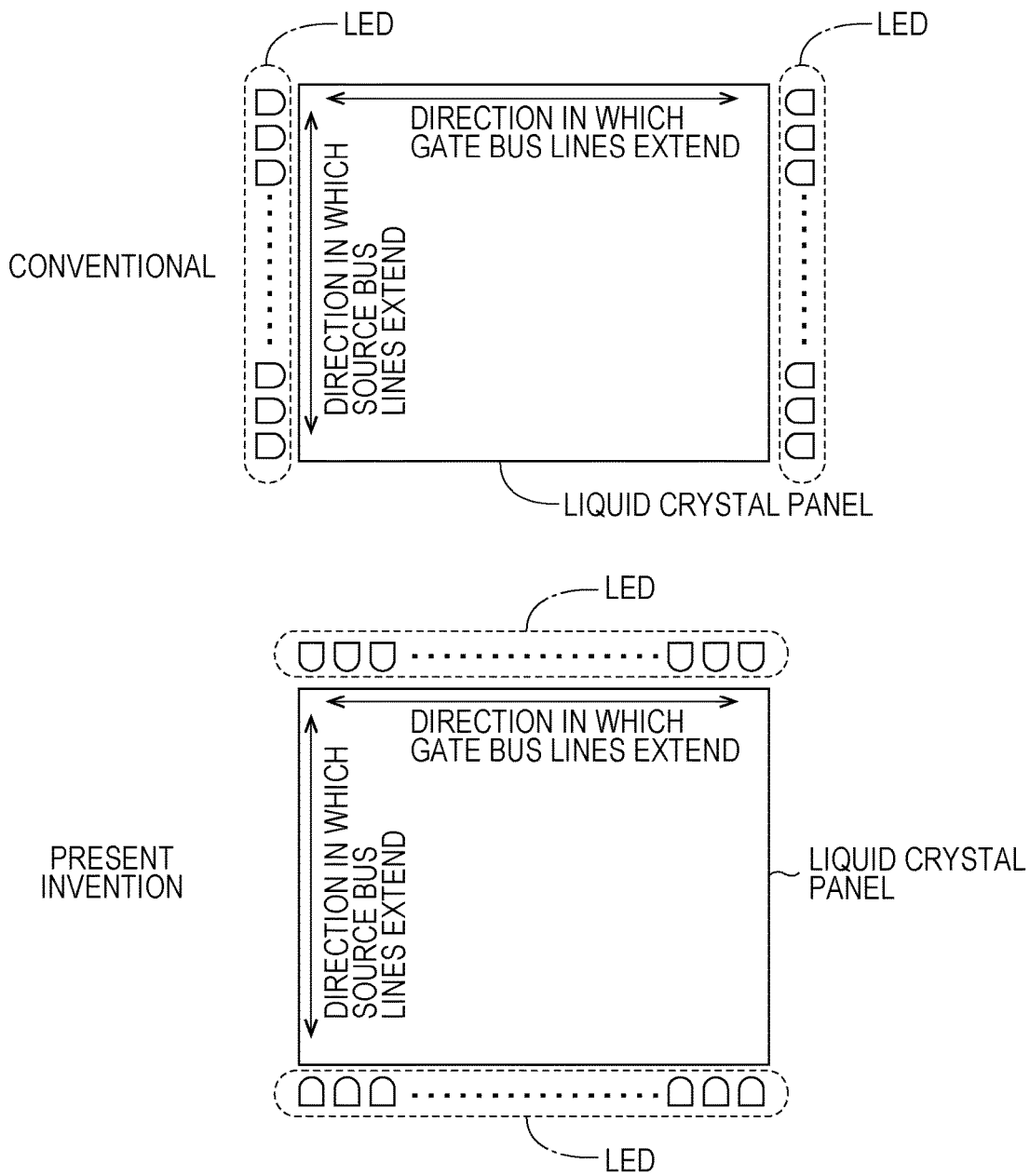
FIG. 3 is a view for explaining arrangement of LEDs in the first embodiment.

The backlight 700 includes LEDs 71U and 71D and light guide plates 72U and 72D. As grasped from FIG. 1, the backlight 700 in the present embodiment is an edge-light type backlight. In this regard, in a conventional liquid crystal display device which adopts an edge-light type backlight, LEDs are provided in a vicinity of one side part and in a vicinity of the other side part of a liquid crystal panel in a direction in which the gate bus lines extend (both right and left sides of the liquid crystal panel) (refer to FIG. 3). On the other hand, in the liquid crystal display device according to the present embodiment, LEDs are provided in a vicinity of one side part and in a vicinity of the other side part of the liquid crystal panel in a direction in which the source bus lines extend (both upper and lower sides of the liquid crystal panel) (refer to FIG. 3). In FIG. 1, a reference numeral 71U is assigned to the LEDs which are provided in a vicinity of an upper part of the panel (hereinafter, referred to as "upper-side LEDs"), and a reference numeral 71D is assigned to the LEDs which are provided in a vicinity of a lower part of the panel (hereinafter, referred to as "lower-side LEDs"). Note that, a first light source group is realized by the upper-side LEDs 71U and a second light source group is realized by the lower-side LEDs 71D.

Figure 4:
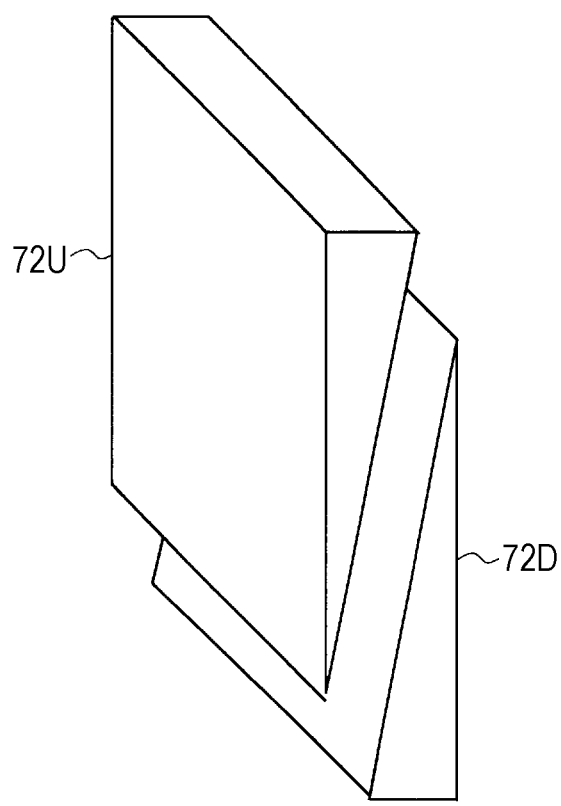
FIG. 4 is a view for explaining light guide plates in the first embodiment.

In the conventional liquid crystal display device which adopts the edge-light type backlight, the backlight is provided with one light guide plate. On the other hand, in the liquid crystal display device according to the present embodiment, the two light guide plates 72U and 72D are provided in the backlight as shown in FIG. 4. Specifically, the light guide plate 72U for guiding light emitted from the upper-side LEDs 71U to the liquid crystal panel 800 (hereinafter, referred to as an "upper-side light guide plate") and the light guide plate 72D for guiding light emitted from the lower-side LEDs 71D to the liquid crystal panel 800 (hereinafter, referred to as a "lower-side light guide plate") are provided in the backlight 700. Note that, a first light guide plate is realized by the upper-side light guide plate 72U and a second light guide plate is realized by the lower-side light guide plate 72D.

Figure 5:
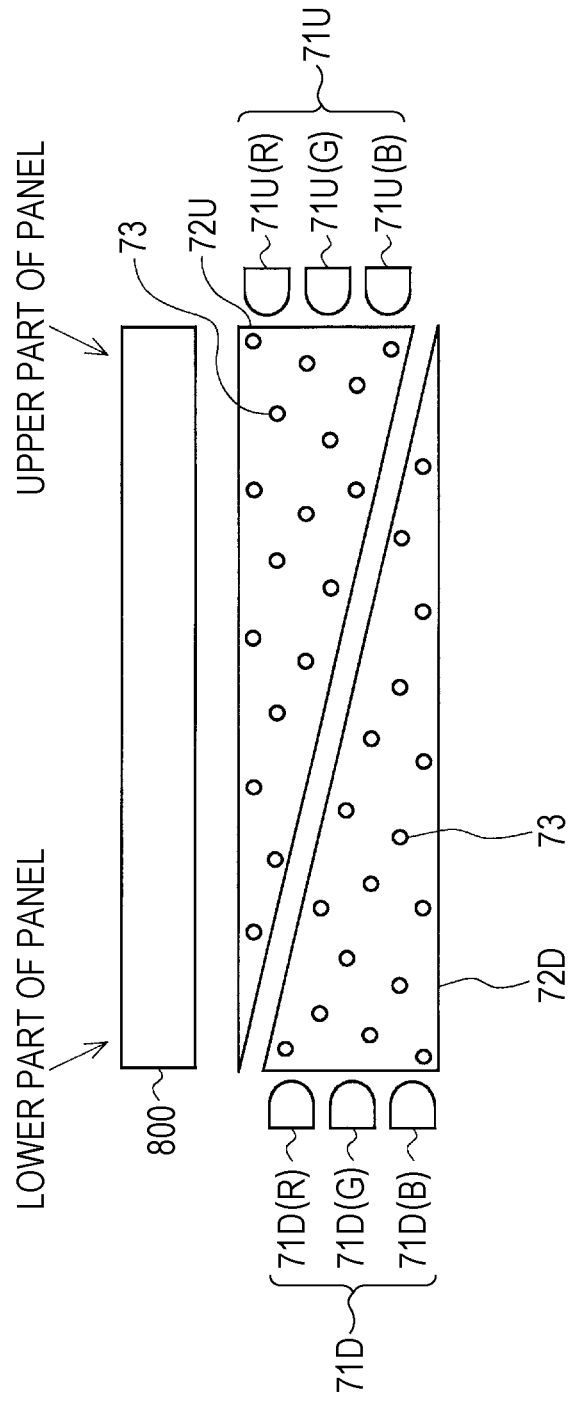
FIG. 5 is a side view of the liquid crystal display device for explaining a detailed configuration of the backlight in the first embodiment.

FIG. 5 is a side view of the liquid crystal display device for explaining a detailed configuration of the backlight 700 in the present embodiment. In the present embodiment, as shown in FIG. 5, the upper-side LEDs 71U are configured by LEDs of three colors composed of a red color LED 71U(R), a green color LED 71U(G), and a blue color LED 71U(B). Similarly, the lower-side LEDs 71D are configured by LEDs of three colors composed of a red color LED 71D(R), a green color LED 71D(G), and a blue color LED 71D(B). Note that, hereinafter, the red color LED 71U(R) is referred to as an "upper-side R-LED", the green color LED 71U(G) is referred to as an "upper-side G-LED", and the blue color LED 71U(B) is referred to as an "upper-side B-LED". In addition, the red color LED 71D(R) is referred to as a "lower-side R-LED", the green color LED 71D(G) is referred to as a "lower-side G-LED", and the blue color LED 71D(B) is referred to as a "lower-side B-LED".

Figure 6:
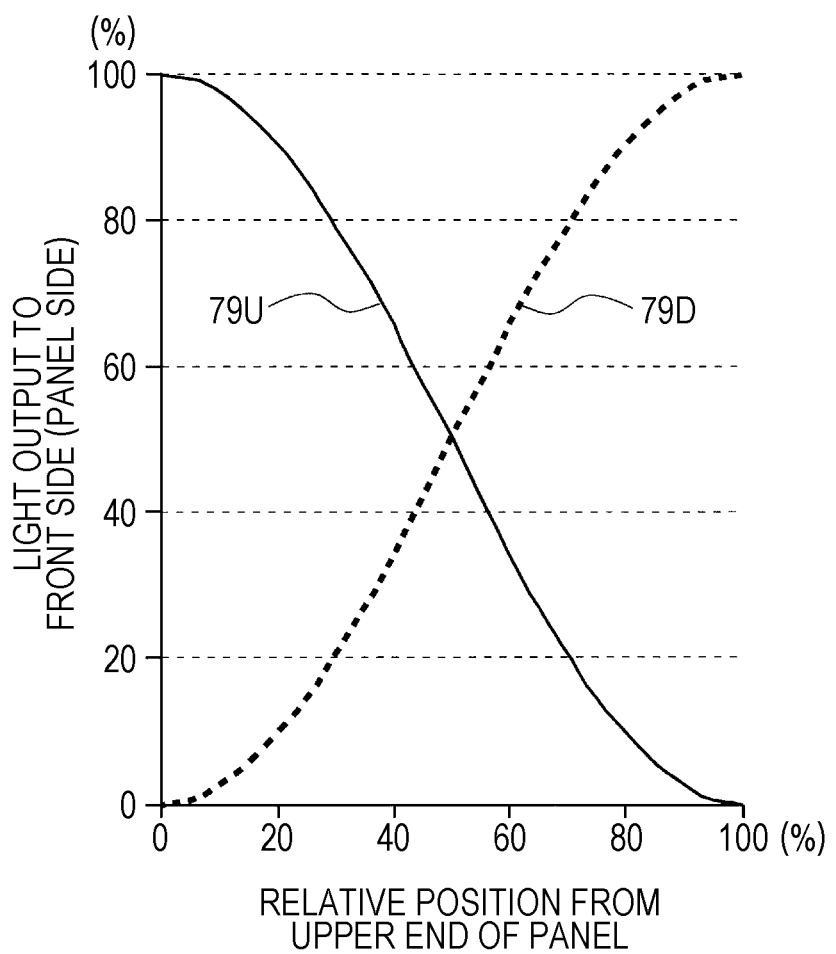
FIG. 6 is a view for explaining light output to a liquid crystal panel side from the light guide plates in the first embodiment.

In the upper-side light guide plate 72U, thickness becomes small gradually as being close to a lower part side of the panel from an upper part side of the panel. In the lower-side light guide plate 72D, thickness becomes small gradually as being close to the upper part side of the panel from the lower part side of the panel. Further, both of the upper-side light guide plate 72U and the lower-side light guide plate 72D contain light diffusion particles (light diffusion beads) 73 for diffusing emission light from the LEDs. In the present embodiment, the plurality of light diffusion particles 73 having different refractive indexes are provided in the upper-side light guide plate 72U so that light output from the upper-side light guide plate 72U to the liquid crystal panel 800 side has a curved line with a reference numeral 79U in a graph shown in FIG. 6. Further, the plurality of light diffusion particles 73 having different refractive indexes are provided in the lower-side light guide plate 72D so that light output from the lower-side light guide plate 72D to the liquid crystal panel 800 side has a curved line with a reference numeral 79D in the graph shown in FIG. 6. Note that, in FIG. 6, a vertical axis represents intensity of the light output from the light guide plates to the liquid crystal panel 800 side (luminance which appears in the liquid crystal panel 800) (in which, maximum is 100%), and a horizontal axis represents a relative position from an upper end of the liquid crystal panel 800 (a lower end of the liquid crystal panel 800 is set as 100%).

Figure 7:
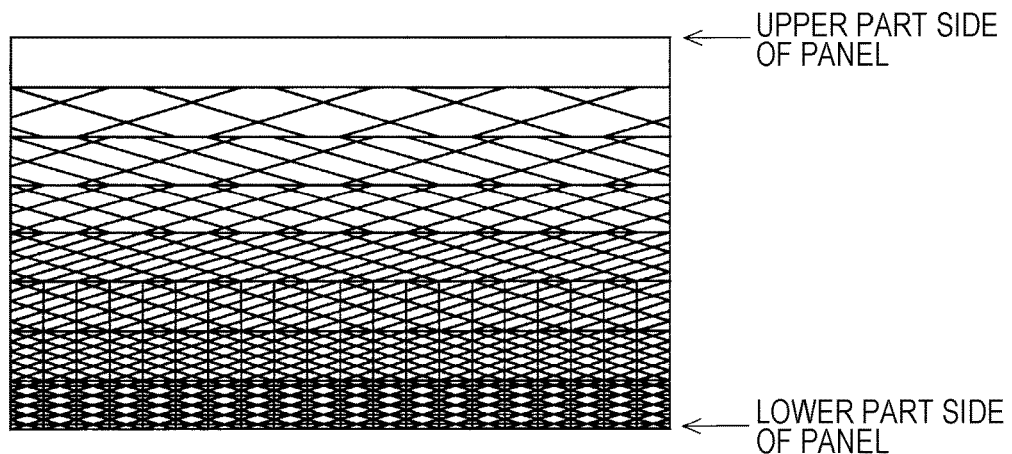
FIG. 7 is a view schematically showing a state of light output from an upper-side light guide plate when all upper-side LEDs are turned into a light emission state in the first embodiment.
Figure 8:
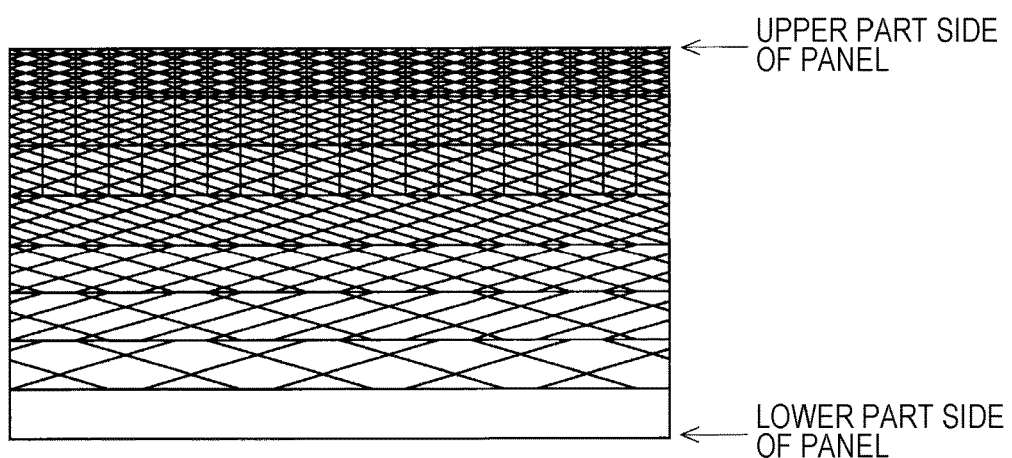
FIG. 8 is a view schematically showing a state of light output from a lower-side light guide plate when all lower-side LEDs are turned into the light emission state in the first embodiment.

FIG. 7 is a view schematically showing a state of the light output from the upper-side light guide plate 72U when all the upper-side LEDs 71U are turned into the light emission state. As grasped from FIG. 7, with the light output from the upper-side light guide plate 72U, the panel becomes bright as being close to the upper part side thereof and the panel becomes dark as being close to the lower part side thereof. FIG. 8 is a view schematically showing a state of the light output from the lower-side light guide plate 72D when all the lower-side LEDs 71D are turned into the light emission state. As grasped from FIG. 8, with the light output from the lower-side light guide plate 72D, the panel becomes bright as being close to the lower part side thereof and the panel becomes dark as being close to the upper part side thereof. Note that, when all the upper-side LEDs 71U and all the lower-side light guide plates 72D are turned into the light emission state, the entire liquid crystal panel 800 is irradiated with light uniformly without occurrence of luminance non-uniformity. In other words, the upper-side light guide plate 72U and the lower-side light guide plate 72D are configured so that luminance becomes uniform over the entire liquid crystal panel 800 when all the upper-side LEDs 71U and all the lower-side LEDs 71D are turned into the light emission state.

Since the light output from the upper-side light guide plate 72U and the light output from the lower-side light guide plate 72D are performed as described above, an influence on display caused by the upper-side LEDs 71U being turned into the light emission state becomes low as being close to the lower part side of the panel from the upper part side of the panel and an influence on display caused by the lower-side LEDs 71D being turned into the light emission state becomes low as being close to the upper part side of the panel from the lower part side of the panel. In this regard, according to a result of simulation, in an area where intensity of the light output from the upper-side light guide plate 72U is 15% or less, even when a pixel has any state, there is no influence on a visible image (image viewed by human eyes) caused by the upper-side LEDs 71U being turned into the light emission state. Further, in an area where intensity of the light output from the lower-side light guide plate 72D is 15% or less, even when a pixel has any state, there is no influence on a visible image caused by the lower-side LEDs 71D being turned into the light emission state. Here, as grasped from FIG. 6, the intensity of the light output from the upper-side light guide plate 72U is 15% at a position where a relative position from the upper end of the panel is 75%, and the intensity of the light output from the lower-side light guide plate 72D is 15% at a position where the relative position from the upper end of the panel is 25%. Accordingly, in the present embodiment, in an area within one fourth from the lower end of the entire liquid crystal panel 800, even when a pixel has any state, there is no influence on a visible image caused by the upper-side LEDs 71U being turned into the light emission state. Further, in an area within one fourth from the upper end of the entire liquid crystal panel 800, even when a pixel has any state, there is no influence on a visible image caused by the lower-side LEDs 71D being turned into the light emission state. A light emission period of each LED is determined in view of these points.

Meanwhile, in a case where the area where the intensity of the light output from the upper-side light guide plate 72U is 15% or less when the upper-side LEDs 71U are turned into the light emission state or the area where the intensity of the light output from the lower-side light guide plate 72D is 15% or less when the lower-side LEDs 71D are turned into the light emission state is defined as a "low-luminance area", the low-luminance area is an area of one fourth of the entire liquid crystal panel 800, so that a time required to drive the gate bus line GL included in the low-luminance area is a length of a quarter field.

<1.3 Configuration of One Frame Period>

Figure 9:
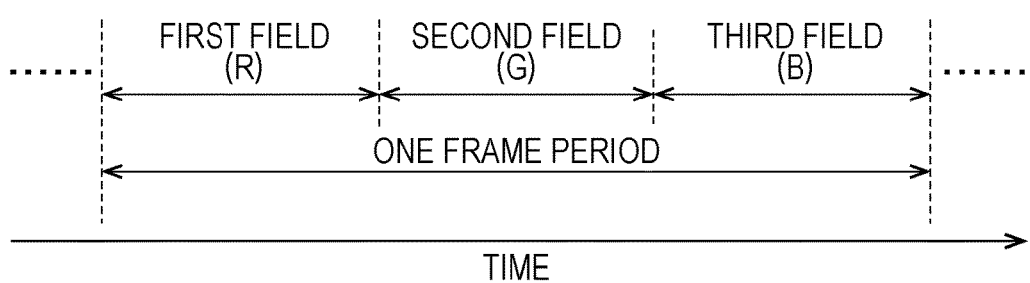
FIG. 9 is a view showing a configuration of one frame period in the first embodiment.

In the present embodiment, one frame period is configured by three fields (first to third fields) as shown in FIG. 9. Note that, in the present embodiment, one frame period is 16.7 milliseconds and one field period is about 5.56 milliseconds. The first field is a field in which writing (charging) for a red color screen is performed. The second field is a field in which writing for a green color screen is performed. The third field is a field in which writing for a blue color screen is performed. The m gate bus lines GL1 to GLm are driven one by one sequentially in each field of these three fields. Then, when the LED of each color is turned into the light emission state as described below, the red color screen, the green color screen and the blue color screen are displayed sequentially and desired color display is performed. Note that, the order of the first filed to the third field is not particularly limited. For example, display may be performed in the order of "the blue color screen, the green color screen, and the red color screen".

<1.4 Light Emission Period of Each LED>

Next, description will be given for a light emission period of each LED in the present embodiment. In the present embodiment, in the same manner as the conventional liquid crystal display device which adopts field-sequential driving, the gate bus lines GL1 to GLm are driven sequentially from the upper part of the panel to the lower part of the panel. On the premise that the gate bus lines GL1 to GLm are driven in this manner, the LED driver 500 controls the state of each LED as follows.

Figure 10:
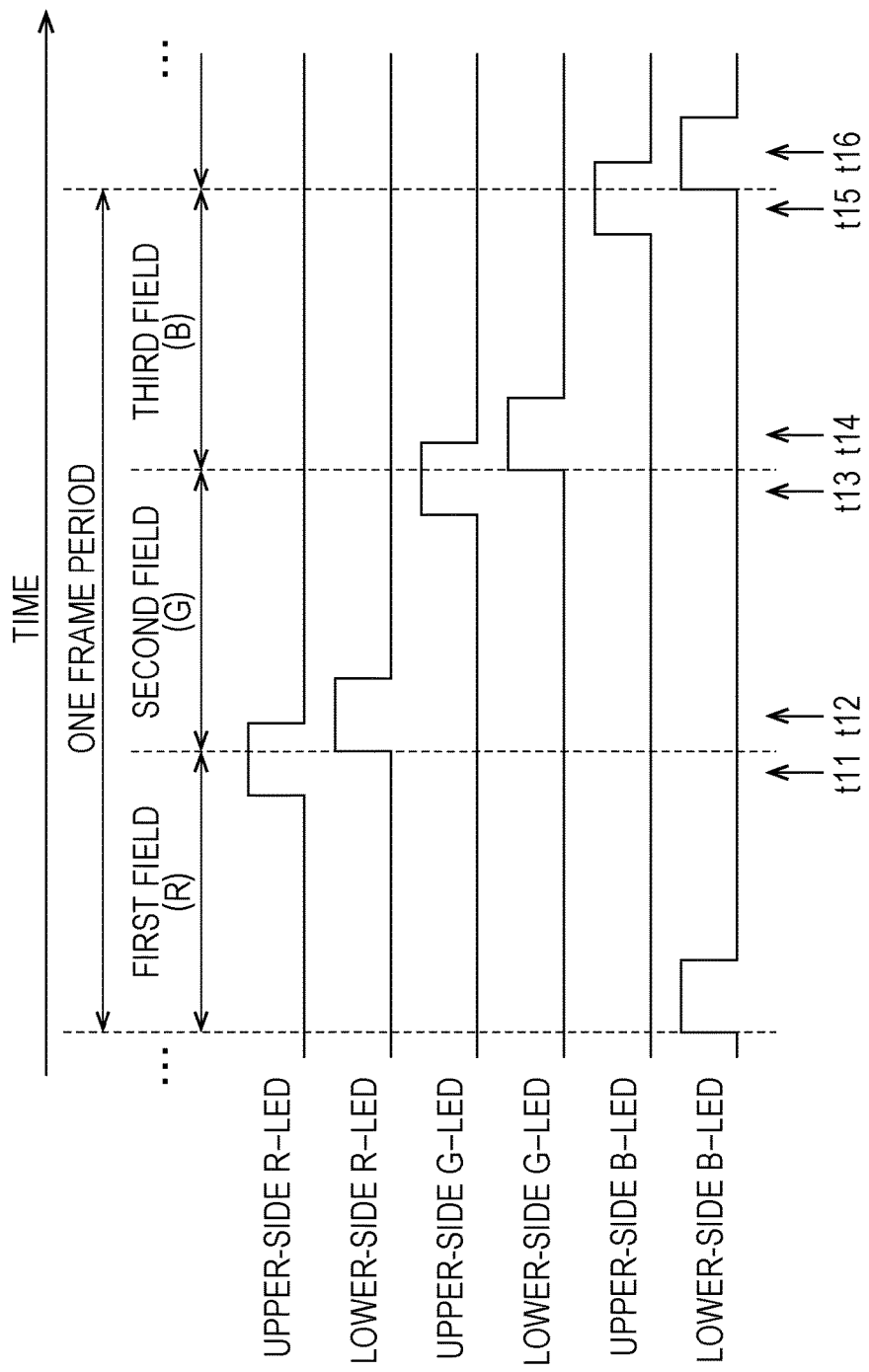
FIG. 10 is a view for explaining a light emission period of each LED in the first embodiment.

A length of the light emission period of each LED is set as a length of a quarter field. Moreover, as shown in FIG. 10, for the LEDs of the respective colors, the LED driver 500 turns the LEDs included in the upper-side LEDs 71U into the light emission state and then turns the LEDs included in the lower-side LEDs 71D into the light emission state, and after turning the LEDs included in the upper-side LEDs 71U into the light-off state, turns the LEDs included in the lower-side LEDs 71D into the light-off state. This will be explained in detail below by focusing on one field. Note that, a field which is focused on is referred to as a "focused field", and an LED to be turned into the light emission state for displaying a screen of a color corresponding to the focused field is referred to as an objective LED. Further, the objective LED included in the upper-side LEDs 71U is referred to as an "upper-side objective LED" and the objective LED included in the lower-side LEDs 71D is referred to as a "lower-side objective LED".

First, description will be given for the light emission period of the upper-side objective LED. The objective LED is to be turned into the light emission state in a period that writing to a pixel capacitance of data of a color corresponding to the focused field is finished at an arbitrary position in the liquid crystal panel 800, which is a period that data of a color corresponding to a field preceding to the focused field (for example, data of red color when the focused field is the second field) is not viewed by eyes of a general person. In addition, as described above, in an area within one fourth from the lower end of the entire liquid crystal panel 800, even when a pixel has any state, there is no influence on a visible image caused by the upper-side LEDs 71U being turned into the light emission state. In other words, in an area within three fourths from the upper end of the entire liquid crystal panel 800, the state of the upper-side LEDs 71U affects display. Further, as described above, it requires from about several milliseconds to ten and several milliseconds before a target transmittance is reached after voltage is applied to a liquid crystal in each pixel. Note that, here, a time required for the liquid crystal to respond sufficiently (for example, a time required to reach a 95% level of the target transmittance) is referred to as a "liquid crystal response time".

In view of the above, it is preferable that the upper-side objective LED is in the light emission state at a time point after the liquid crystal response time has passed with a time point when writing to the pixel capacitance for the data of the color corresponding to the focused field is performed at a position three fourths from the upper end of the entire liquid crystal panel 800 (a position one fourth from the lower end) as a reference. Further, as described above, a length of a time required to drive the gate bus line GL included in the area within one fourth from the lower end of the entire liquid crystal panel 800 (low-luminance area) is a length of a quarter field.

Furthermore, as described above, the length of the light emission period of each LED is a length of a quarter field. Accordingly, in the present embodiment, the LED driver 500 turns the upper-side objective LED into the light emission state at a timing of tu(s) obtained by a following formula (1) and turns the upper-side objective LED into the light-off state at a timing of tu(e) obtained by a following formula (2) with a start time point of the focused field as a reference.

$$tu(s)=f-f/4+res-f/4 \tag{1}$$

$$tu(e)=f-f/4+res \tag{2}$$

Here, f represents the length of one field period and res represents the liquid crystal response time.

Next, description will be given for the light emission period of the lower-side objective LED. When the light emission period of the lower-side objective LED is determined, it is necessary to consider an influence of writing to a pixel capacitance in a field following the focused field. Here, in the present embodiment, the lower-side light guide plate 72D is configured so that luminance of the liquid crystal panel 800 becomes low gradually as being close to the upper part side of the panel from the lower part side of the panel when all the LEDs included in the lower-side LEDs 71D are turned into the light emission state. Therefore, as described above, in the area within one fourth from the upper end of the entire liquid crystal panel 800, even when a pixel has any state, there is no influence on a visible image caused by the lower-side LEDs 71D being turned into the light emission state.

In view of the above, it is possible to turn the lower-side objective LED into the light emission state until a time point that writing to the pixel capacitance for data of a color corresponding to the field following the focused field is performed at a position one fourth from the upper end of the entire liquid crystal panel 800. Further, as described above, the length of the light emission period of each LED is the length of the quarter field. Accordingly, in the present embodiment, the LED driver 500 turns the lower-side objective LED into the light emission state at a timing of td(s) obtained by a following formula (3) and turns the lower-side objective LED into the light-off state at a timing of td(e) obtained by a following formula (4) with a start time point of the focused field as a reference.

$$td(s)=f+f/4-f/4 \tag{3}$$

$$td(e)=f+f/4 \tag{4}$$

Here, it is premised that the liquid crystal response time res is 2 milliseconds. Since the length of one field period is 5.56 milliseconds, in this case, the tu(s) is 4.78 milliseconds, the tu(e) is 6.17 milliseconds, the td(s) is 5.56 milliseconds and the td(e) is 6.95 milliseconds. That is, for displaying an image for one frame, the state of each LED is controlled as follows (refer to FIG. 10). First, the upper-side R-LED is turned into the light emission state after 4.78 milliseconds from a start time point of the first field, the lower-side R-LED is turned into the light emission state at a start time point of the second field, the upper-side R-LED is turned into the light-off state after 0.61 millisecond from the start time point of the second field, and the lower-side R-LED is turned into the light-off state after 1.39 milliseconds from the start time point of the second field. Thereafter, the upper-side G-LED is turned into the light emission state after 4.78 milliseconds from the start time point of the second field, the lower-side G-LED is turned into the light emission state at a start time point of the third field, the upper-side G-LED is turned into the light-off state after 0.61 millisecond from the start time point of the third field, and the lower-side G-LED is turned into the light-off state after 1.39 milliseconds from the start time point of the third field. Further, the upper-side B-LED is turned into the light emission state after 4.78 milliseconds from the start time point of the third field, the lower-side B-LED is turned into the light emission state at a start time point of a first field of a next frame, the upper-side B-LED is turned into the light-off state after 0.61 millisecond from the start time point of this first field, and the lower-side B-LED is turned into the light-off state after 1.39 milliseconds from the start time point of this first field.

<1.5 Display Image>

Figure 11:
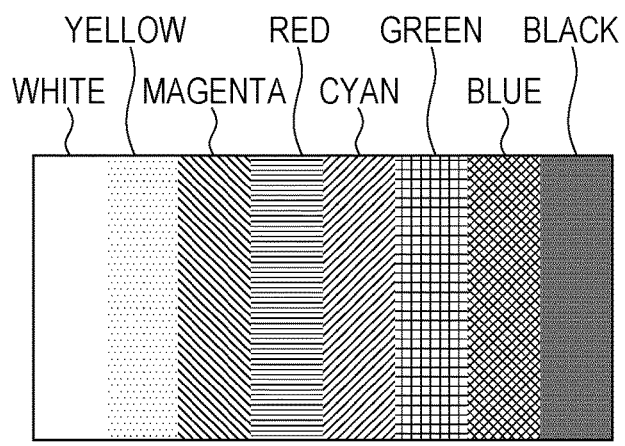
FIG. 11 is a view showing one example of a target image.
Figure 12:
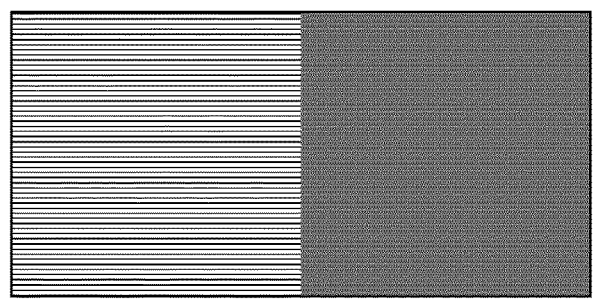
FIG. 12 is a view showing a target display image in a first field in the first embodiment.
Figure 13:
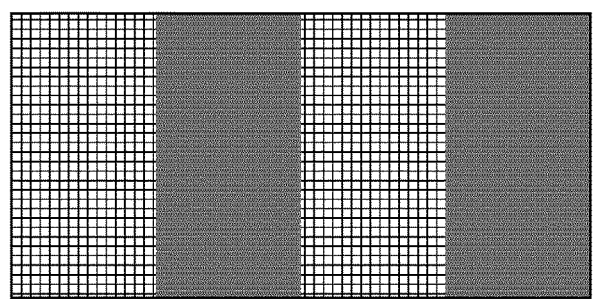
FIG. 13 is a view showing a target display image in a second field in the first embodiment.
Figure 14:
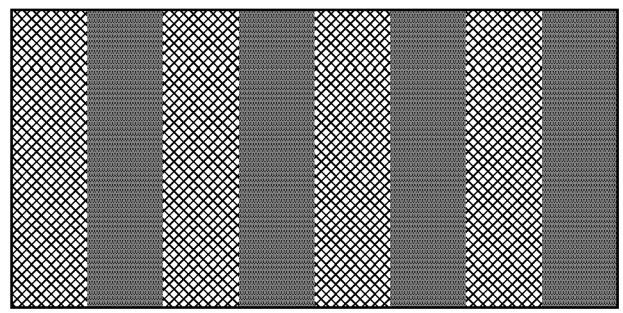
FIG. 14 is a view showing a target display image in a third field in the first embodiment.
Figure 15:
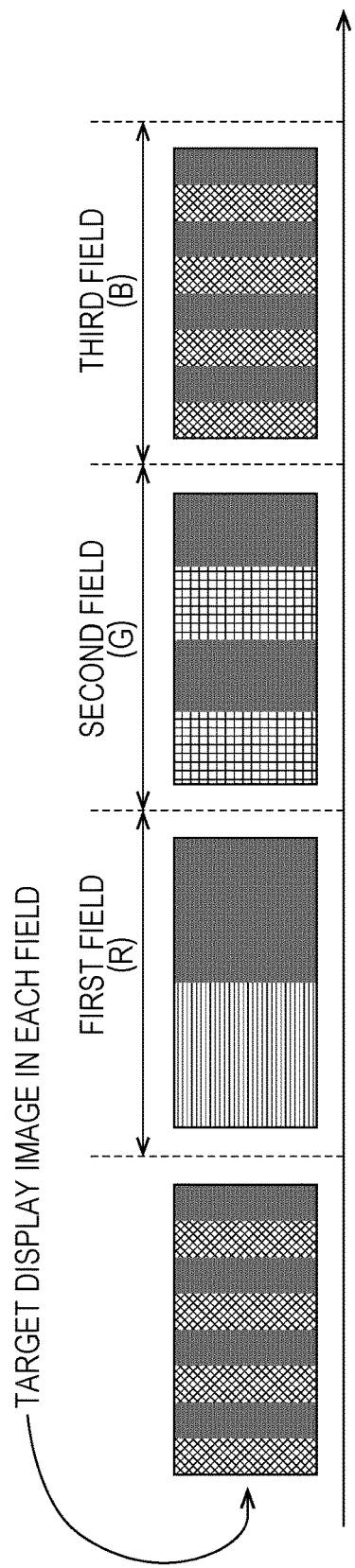
FIG. 15 is a view showing a transition of a target display image in the first embodiment.
Figure 16:
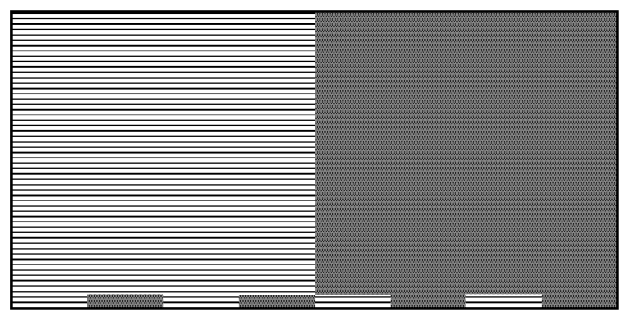
FIG. 16 is a view showing a display image at a time point t11 (refer to FIG. 10) in the first embodiment.
Figure 17:
FIG. 17 is a view showing a display image at a time point t12 (refer to FIG. 10) in the first embodiment.
Figure 18:
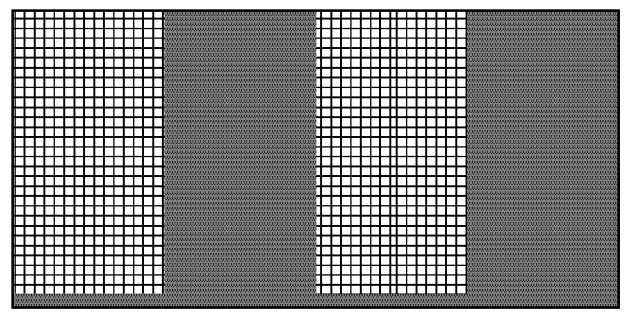
FIG. 18 is a view showing a display image at a time point t13 (refer to FIG. 10) in the first embodiment.
Figure 19:
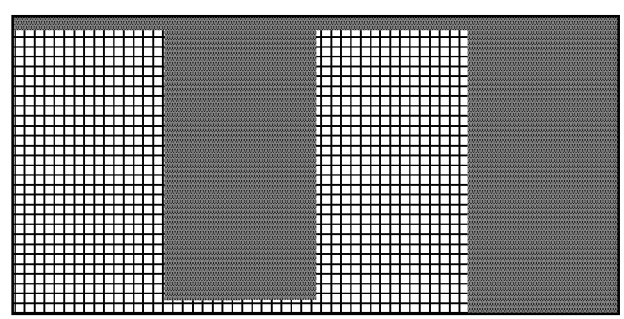
FIG. 19 is a view showing a display image at a time point t14 (refer to FIG. 10) in the first embodiment.
Figure 20:
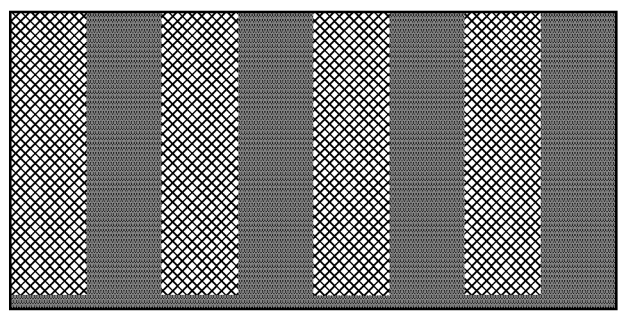
FIG. 20 is a view showing a display image at a time point t15 (refer to FIG. 10) in the first embodiment.
Figure 21:
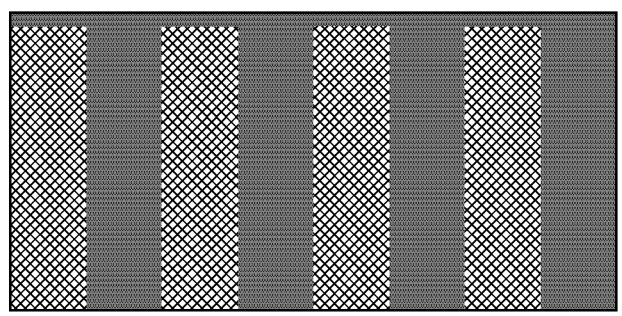
FIG. 21 is a view showing a display image at a time point t16 (refer to FIG. 10) in the first embodiment.

Next, description will be given for what image display is performed when the states of the LEDs are controlled as described above. Here, it is premised that an image as shown in FIG. 11 is a target display image. In this case, the target display image in the first field is an image as shown in FIG. 12, the target display image in the second field is an image as shown in FIG. 13, and the target display image in the third field is an image as shown in FIG. 14. That is, it is preferable that the display image makes a transition as shown in FIG. 15. In this regard, the display image at each time point during one frame period (refer to FIG. 10) is as follows in the present embodiment. In the first field, the display images at a time point t11 and at a time point t12 are images as shown in FIG. 16 and FIG. 17, respectively. In the second field, display images at a time point t13 and at a time point t14 are images as shown in FIG. 18 and FIG. 19, respectively. In the third field, display images at a time point t15 and at a time point t16 are images as shown in FIG. 20 and FIG. 21, respectively. As a result of this, an image which is viewed by human eyes is almost an image as shown in FIG. 11. That is, according to the present embodiment, a targeted image in which no color mixing occurs is viewed by human eyes.

<1.6 Generalization of Formula for Obtaining Light Emission Period of LED>

Here, description will be given for generalization of the formulas (1) to (4) for obtaining the light emission period of the LED. It is premised in the formulas (1) to (4) that the length of the light emission period of the LED is the length of the quarter field and the length of the time required to drive the gate bus line GL included in the low-luminance area is also the length of the quarter field, but the present invention is not limited thereto. When the length of the light emission period of the LED is ft and the time required to drive the gate bus line GL included in the low-luminance area is fa, the tu(s), the tu(e), the td(s) and the td(e) may be obtained by a formula (A), a formula (B), a formula (C) and a formula (D) as follows, respectively.

$$tu(s)=f-fa+res-ft \quad (A)$$

$$tu(e)=f-fa+res \quad (B)$$

$$td(s)=f+fa-ft \quad (C)$$

$$td(e)=f+fa \quad (D)$$

Figure 22:
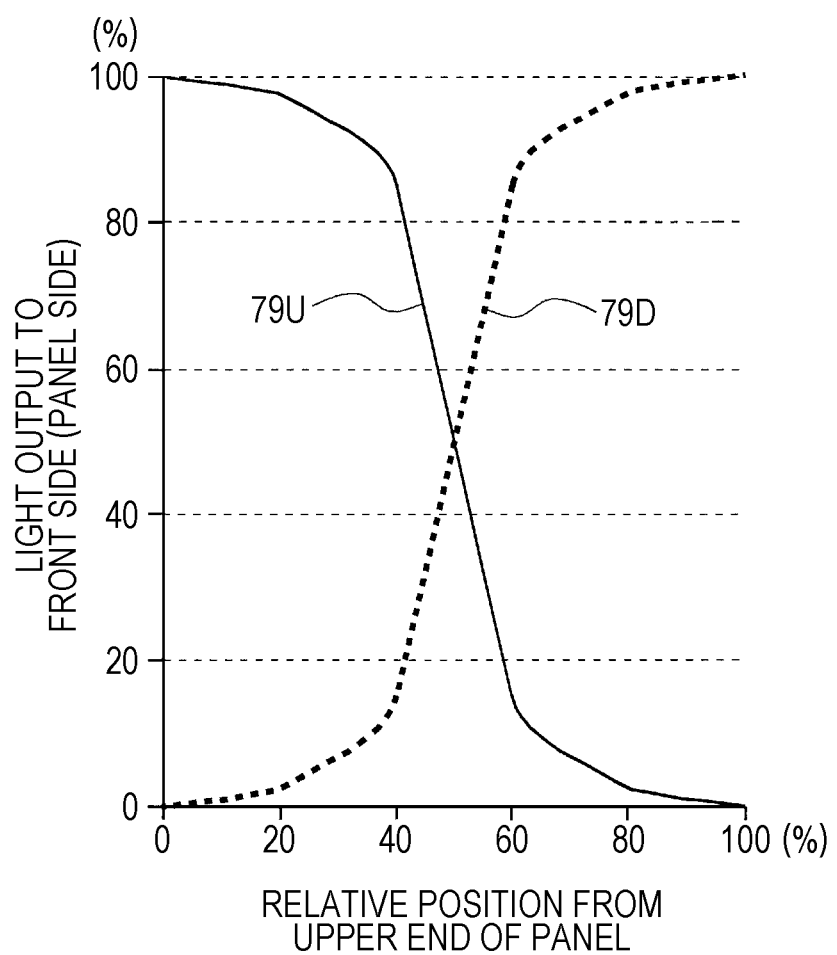
FIG. 22 is a view for explaining generalization of a formula for obtaining a light emission period of LEDs in the first embodiment.

For example, when the light output from the upper-side light guide plate 72U to the liquid crystal panel 800 side is represented by a curved line with the reference numeral 79U in a graph shown in FIG. 22 and the light output from the lower-side light guide plate 72D to the liquid crystal panel 800 side is represented by a curved line with the reference numeral 79D in the graph shown in FIG. 22, the intensity of the light output from the upper-side light guide plate 72U is 15% at a position where the relative position from the upper end of the panel is 60% and the intensity of the light output from the lower-side light guide plate 72D is 15% at a position where the relative position from the upper end of the panel is 40%. In this case, the time required to drive the gate bus line GL included in the low-luminance area is a length of two fifths field. Accordingly, the fa is 2.22 milliseconds. Further, when the length of the light emission period of the LED is one third field, the ft is 1.86 milliseconds. Here, when the liquid crystal response time res is 1.9 milliseconds, the tu(s), the tu(e), the td(s) and the td(e) are respectively obtained as follows.

$$tu(s) = 5.56 - 2.22 + 1.9 - 1.86$$
$$= 3.38$$

$$tu(e) = 5.56 - 2.22 + 1.9$$
$$= 5.24$$

$$td(s) = 5.56 + 2.22 - 1.9$$
$$= 5.88$$

$$td(e) = 5.56 + 2.22$$
$$= 7.88$$

Figure 23:
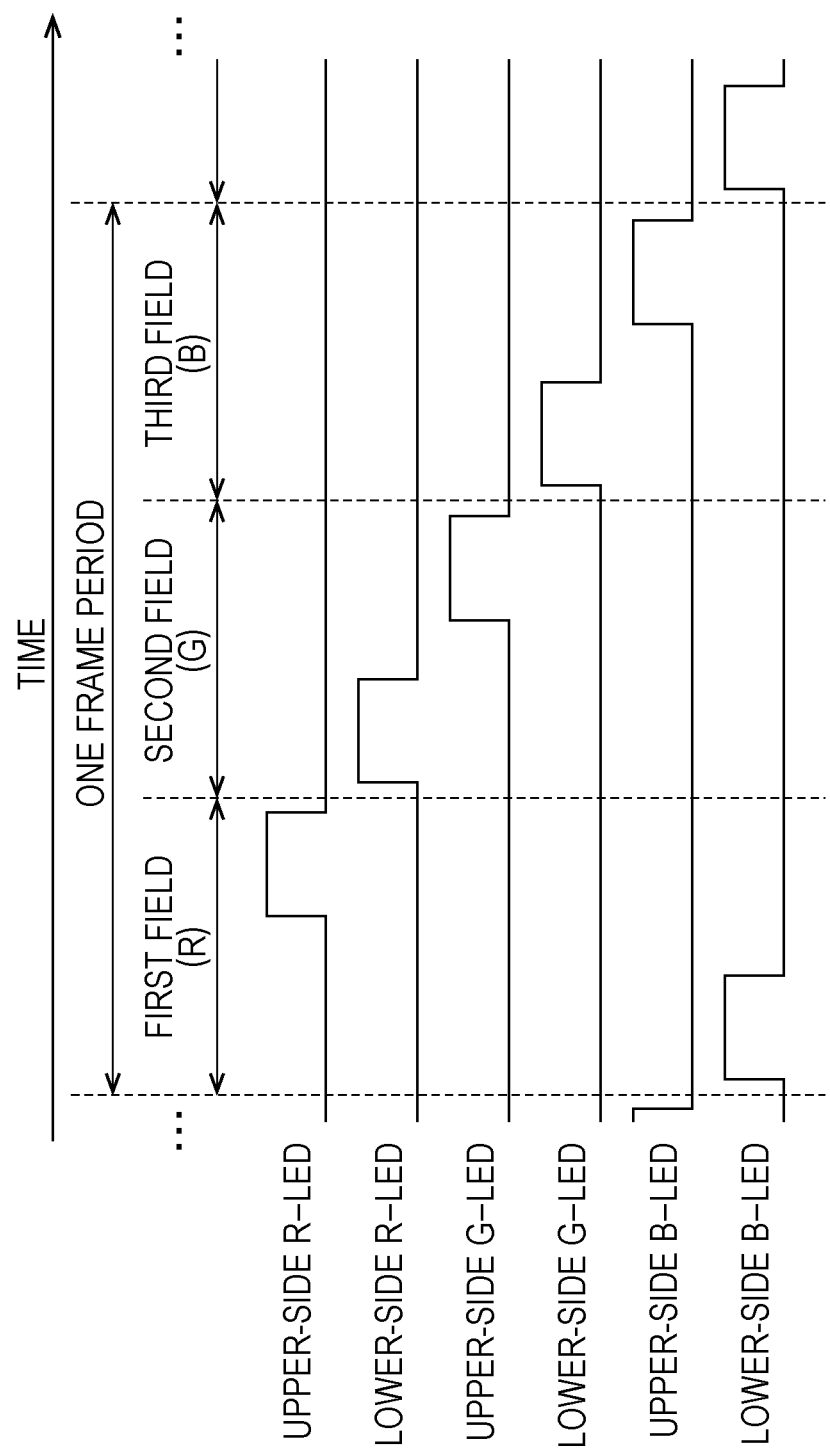
FIG. 23 is a view for explaining generalization of the formula for obtaining the light emission period of the LEDs in the first embodiment.

Thereby, as shown in FIG. 23, the upper-side objective LED is turned into the light emission state after 3.38 milliseconds from a start time point of the focused field, the upper-side objective LED is turned into the light-off state after 5.24 milliseconds from the start time point of the focused field, the lower-side objective LED is turned into the light emission state after 0.32 millisecond from a start time point of the field following the focused field, and the lower-side objective LED is turned into the light-off state after 2.32 milliseconds from the start time point of the field following the focused filed.

<1.7 Effect>

According to the present embodiment, the LEDs (the upper-side LEDs 71U and the lower-side LEDs 71D) are provided in both upper and lower sides of the liquid crystal panel 800 as a backlight light source. Further, a reflection wall or the like is not provided in the liquid crystal panel 800. Therefore, it is possible to make the display unit 600 transparent. The backlight 700 is provided with the upper-side light guide plate 72U that guides emission light from the upper-side LEDs 71U to the liquid crystal panel 800 and the lower-side light guide plate 72D that guides emission light from the lower-side LEDs 71D to the liquid crystal panel 800. In such a configuration, for displaying a screen of a color corresponding to each field, first, the upper-side LEDs 71U are turned into the light emission state and the lower-side LEDs 71D are then turned into the light emission state. Here, the upper-side light guide plate 72U is configured so that luminance becomes low gradually as being close to the lower part of the panel from the upper part of the panel when the upper-side LEDs 71U are turned into the light emission state, and the lower-side light guide plate 72D is configured so that luminance becomes low gradually as being close to the upper part of the panel from the lower part of the panel when the lower-side LEDs 71D are turned into the light emission state. Thus, it is possible to make the upper part of the panel and the lower part of the panel bright sequentially. That is, it is possible to perform backlight scanning in a pseudo manner.

As above, according to the present embodiment, it is possible to make the display unit 600 transparent and to perform backlight scanning in a pseudo manner. That is, it is possible to perform field-sequential driving without causing color mixing in the liquid crystal display device capable of displaying an image while keeping a background in a transparent state.

<1.8 Modified Example>

According to the formula (C) and the formula (D), the light emission period of the lower-side LEDs 71D does not depend on the liquid crystal response time res. However, the present invention is not limited thereto, and when the liquid crystal response time res is longer than the time fa required to drive the gate bus line GL included in the low-luminance area, the td(s) and the td(e) may be obtained by a formula (E) and a formula (F) as follows, respectively.

$$td(s)=f+res-ft \quad (E)$$

$$td(e)=f+res \quad (F)$$

For example, when the length f of one field period is 5.56 milliseconds, the length ft of the light emission period of the LED is 1.39 milliseconds, the time fa required to drive the gate bus line GL included in the low-luminance area is 1.39 milliseconds, and the liquid crystal response time res is 2 milliseconds, according to the present modified example, the td(s) is 6.17 milliseconds and the td(e) is 7.56 milliseconds. Accordingly, the lower-side objective LED is turned into the light emission state after 0.61 millisecond from an end time point of the focused field (a start time point of the field following the focused field) and the lower-side objective LED is turned into the light-off state after 2 milliseconds from the end time point of the focused field.

According to the present modified example, the lower-side LEDs 71D are kept in the light emission state even after the fa (time required to drive the gate bus line GL included in the low-luminance area) has passed with an end time point of each field as a reference. Therefore, it is concerned that color mixing is caused. However, the lower-side LEDs 71D are kept in the light emission state until the liquid crystal is turned into a sufficiently responding state in a pixel of a lowest part of the panel, and therefore, luminance and contrast in the lower part of the panel become excellent compared with the first embodiment.

<2. Second Embodiment>
<2.1 Configuration, Etc.>

Description will be given for a second embodiment of the present invention. Since an overall configuration and a configuration of the backlight are almost same as those of the first embodiment (refer to FIG. 1 to FIG. 8), only different points from the first embodiment will be described. An input image signal DIN of 60 Hz is given to the frame rate conversion unit 100 (refer to FIG. 2) and data of 240 Hz is output from the frame rate conversion unit 100 as target image data DAT. That is, in the present embodiment, a frame rate when an image is displayed on the display unit 600 (display frame rate) is 240 Hz.

<2.2 Configuration of One Frame Period>

Figure 24:
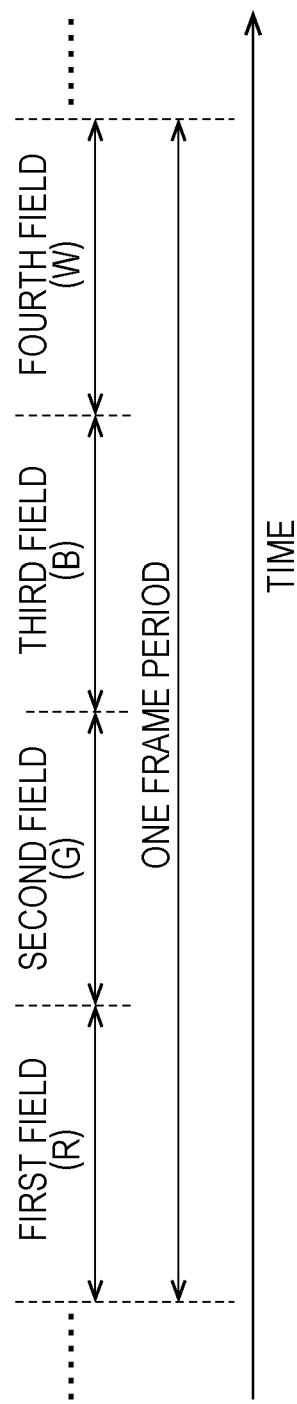
FIG. 24 is a view showing a configuration of one frame period in a second embodiment of the present invention.

In the present embodiment, one frame period is configured by four fields (first to fourth fields) as shown in FIG. 24. Note that, in the present embodiment, one frame period is 16.7 milliseconds and one field period is about 4.18 milliseconds. The first field is a field in which writing (charging) for a red color screen is performed. The second field is a field in which writing for a green color screen is performed. The third field is a field in which writing for a blue color screen is performed. The fourth field is a field in which writing for a white color screen is performed. The m gate bus lines GL1 to GLm are driven one by one sequentially in each field of these four fields. Then, when the LED of each color is turned into the light emission state as described below, the red color screen, the green color screen, the blue color screen and the white color screen are displayed sequentially and desired color display is performed. Note that, the field in which writing for the white color screen is performed may not be a last field during one frame period.

When the white color screen is displayed, the LEDs of all colors of RGB are turned into the light emission state. That is, by turning the red color LED, the green color LED and the blue color LED into the light emission state, the liquid crystal panel 800 is irradiated with white color light. Note that, in the present embodiment, when the fourth field is the focused field, all of the upper-side R-LED, the upper-side G-LED and the upper-side B-LED serve as the upper-side objective LEDs and all of the lower-side R-LED, the lower-side G-LED and the lower-side B-LED serve as the lower-side objective LEDs.

<2.3 Light Emission Period of Each LED>

Figure 25:
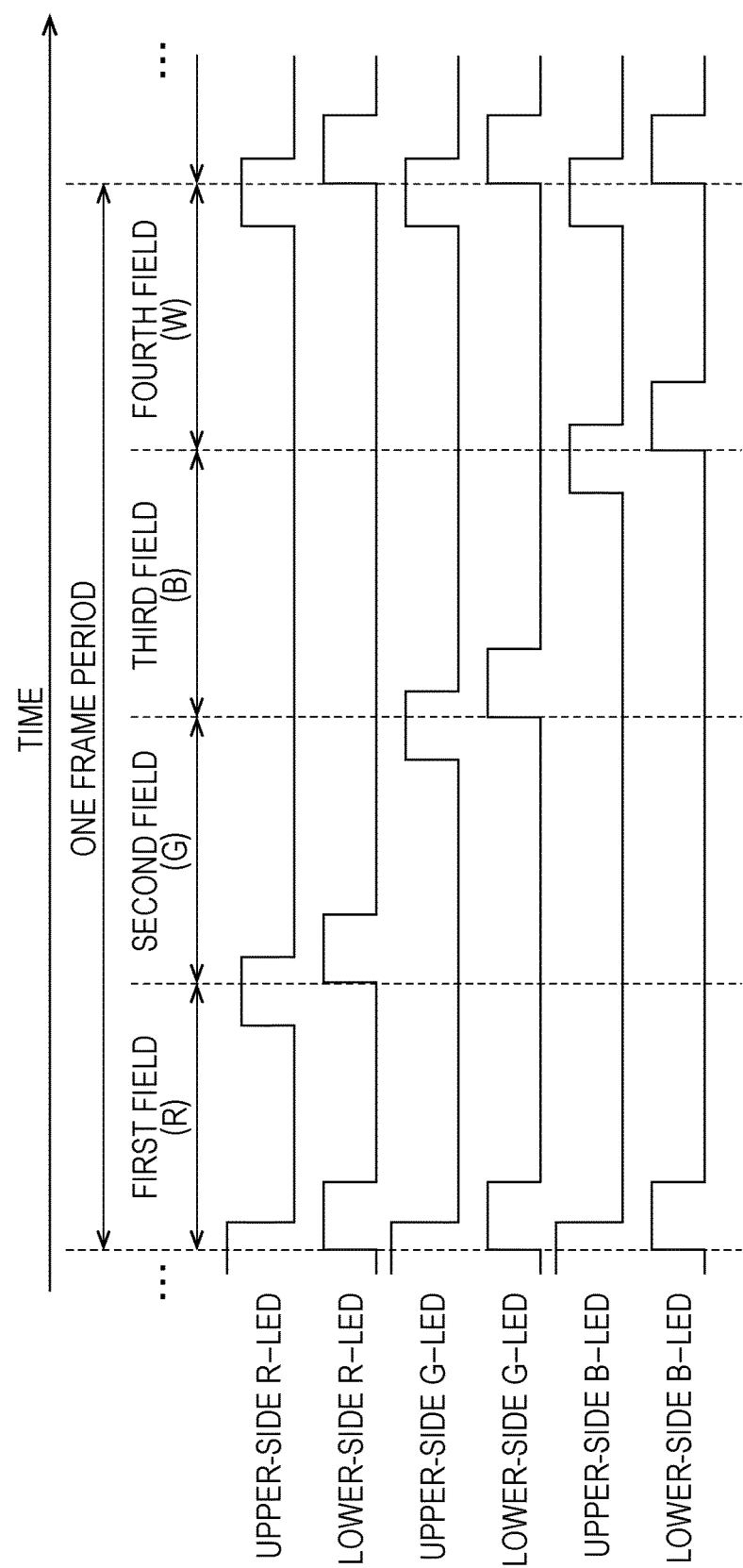
FIG. 25 is a view for explaining a light emission period of each LED in the second embodiment.

Next, description will be given for the light emission period of each LED in the present embodiment with reference to FIG. 25. As to display of screens of colors corresponding to the respective first to third fields, each LED is turned into the light emission state in the same manner as the first embodiment. When a screen of a color corresponding to the fourth field (that is, white color) is displayed, all of the upper-side R-LED, the upper-side G-LED and the upper-side B-LED are turned into the light emission state and all of the lower-side R-LED, the lower-side G-LED and the lower-side B-LED are then turned into the light emission state, and all of the upper-side R-LED, the upper-side G-LED and the upper-side B-LED are turned into the light-off state and all of the lower-side R-LED, the lower-side G-LED and the lower-side B-LED are then turned into the light-off state.

As above, in the present embodiment as well, the LED driver 500 turns the upper-side objective LEDs into the light emission state at a timing of the tu(s) obtained by the formula (1), turns the upper-side objective LEDs into the light-off state at a timing of the tu(e) obtained by the formula (2), turns the lower-side objective LEDs into the light emission state at a timing of the td(s) obtained by the formula (3), and turns the lower-side objective LEDs into the light-off state at a timing of the td(e) obtained by the formula (4) with a start time point of the focused field as a reference.

Here, it is premised that the liquid crystal response time res is 2 milliseconds. Since the length of one field period is 5.56 milliseconds, in this case, the tu(s) is 4.78 milliseconds, the tu(e) is 6.17 milliseconds, the td(s) is 5.56 milliseconds and the td(e) is 6.95 milliseconds. That is, for displaying an image for one frame, the state of each LED is controlled as follows (refer to FIG. 25). As to display of screens of colors corresponding to the respective first to third fields, each LED is controlled in the same manner as the first embodiment. As to display of the screen of the color corresponding to the fourth field, the upper-side R-LED, the upper-side G-LED and the upper-side B-LED are turned into the light emission state after 4.78 milliseconds from a start time point of the fourth field, the lower-side R-LED, the lower-side G-LED and the lower-side B-LED are turned into the light emission state at the start time point of the fourth field, the upper-side R-LED, the upper-side G-LED and the upper-side B-LED are turned into the light-off state after 0.61 millisecond from the start time point of the fourth field, and the lower-side R-LED, the lower-side G-LED and the lower-side B-LED are turned into the light-off state after 1.39 milliseconds from the start time point of the fourth field.

<2.4 Effect>

According to the present embodiment, after the red color LED, the green color LED and the blue color LED are turned into the light emission state sequentially, the LEDs of these all colors are turned into the light emission state in the fourth field. Therefore, in addition to the effect same as that of the first embodiment, an effect that it is possible to suppress occurrence of color breakup when a moving image is displayed is achieved.

<3. Third Embodiment>

<3.1 Configuration, Etc.>

Description will be given for a third embodiment of the present invention. Since an overall configuration and a configuration of the backlight are the same as those of the first embodiment (refer to FIG. 1 to FIG. 8), description thereof will be omitted.

<3.2 Configuration of One Frame Period>

Figure 26:
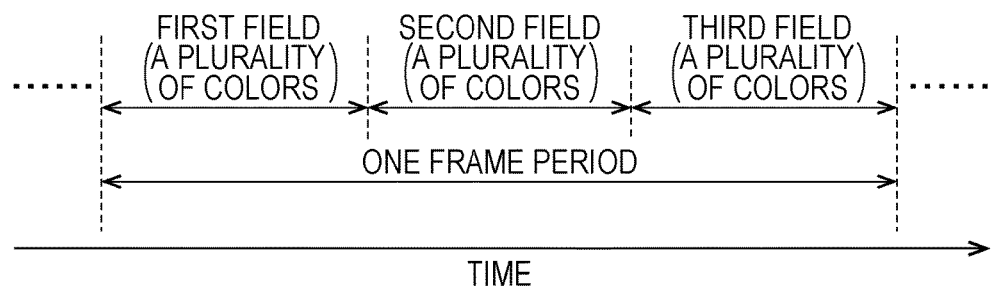
FIG. 26 is a view showing a configuration of one frame period in a third embodiment of the present invention.

FIG. 26 is a view showing a configuration of one frame period in the present embodiment. One frame period is configured by three fields (first to third fields) in the same manner as the first embodiment. In the present embodiment, however, LEDs of a plurality of colors are turned into the light emission state for displaying a screen of a color corresponding to each field. The colors of the LEDs which are turned into the light emission state in each field depend on a target display image. Note that, the present invention is also applicable to a case where one frame period is configured by four or more fields in which LEDs of a plurality of colors are turned into the light emission state.

<3.3 Light Emission Period of Each LED>

Figure 27:
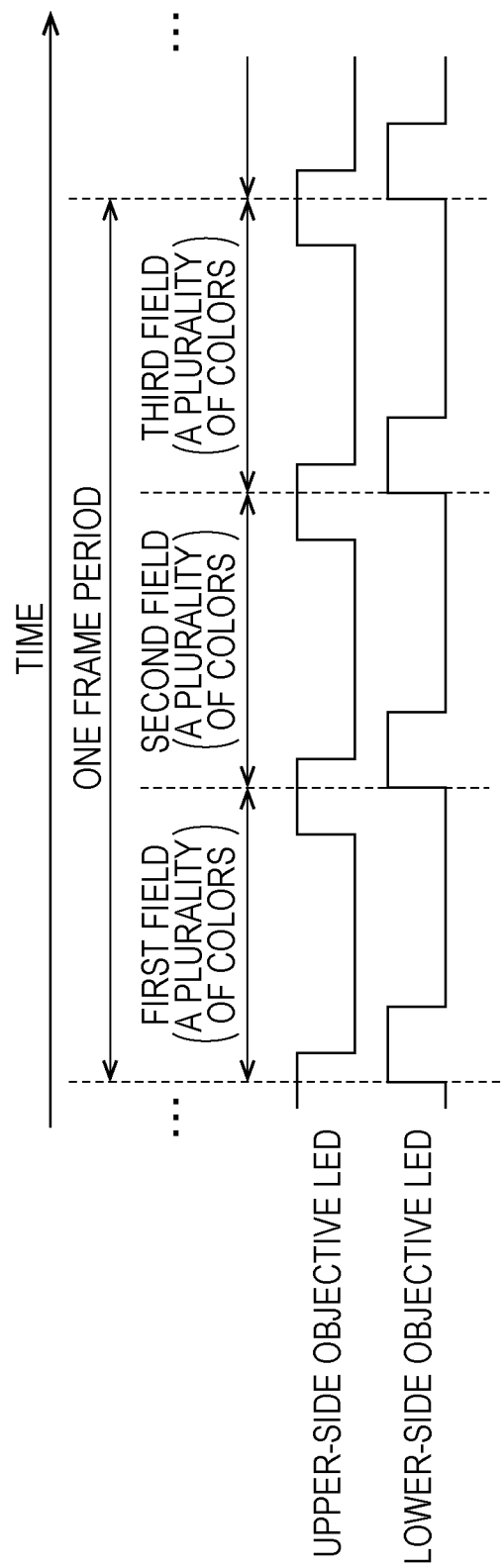
FIG. 27 is a view for explaining a light emission period of each LED in the third embodiment.
Figure 28:
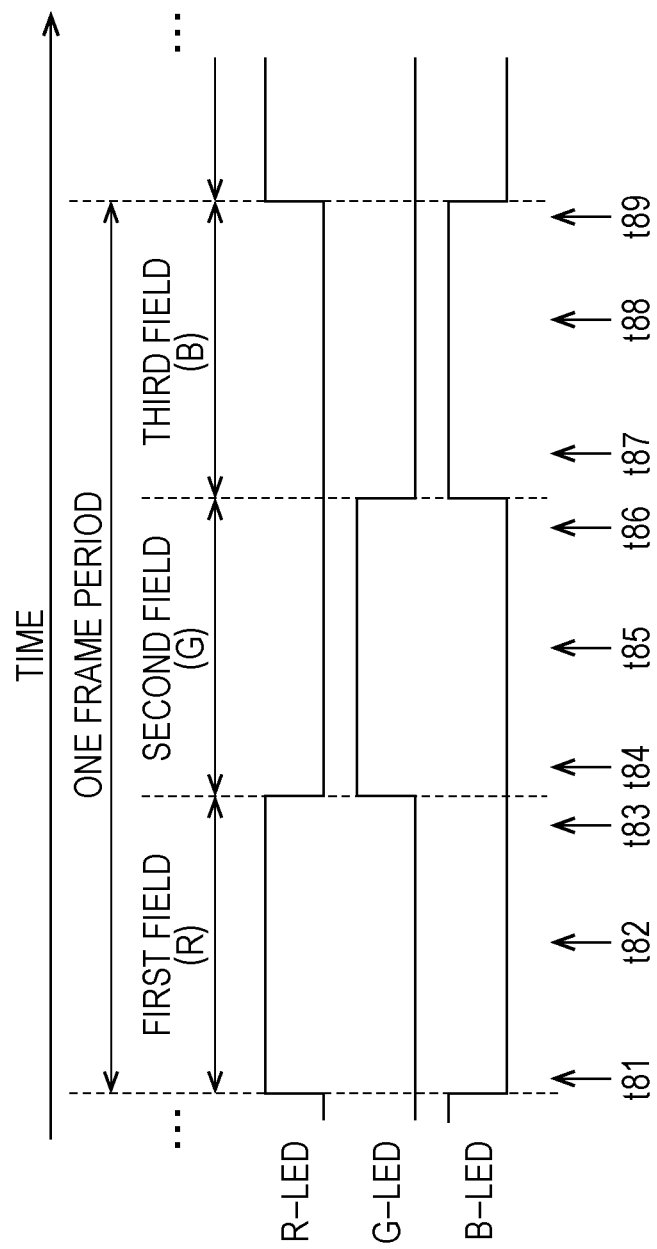
FIG. 28 is a view showing a configuration of one frame period in a conventional example (first method).
Figure 29:
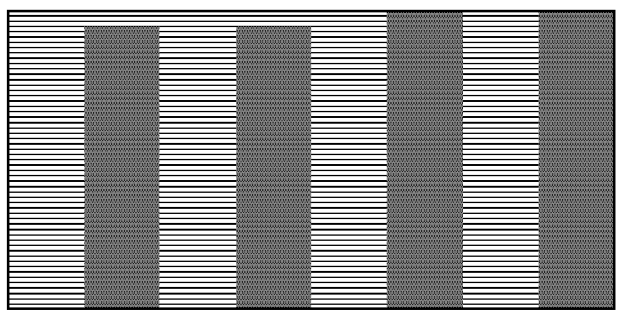
FIG. 29 is a view showing a display image at a time point t81 (refer to FIG. 28) in the conventional example (first method).
Figure 30:
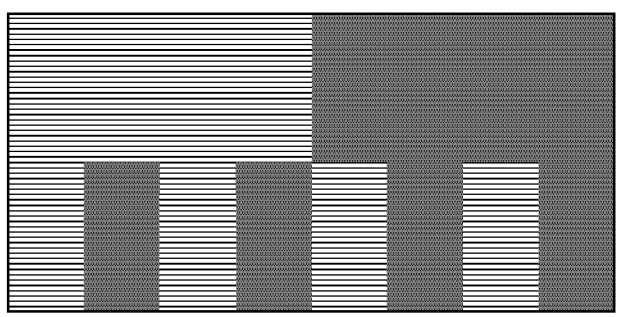
FIG. 30 is a view showing a display image at a time point t82 (refer to FIG. 28) in the conventional example (first method).
Figure 31:
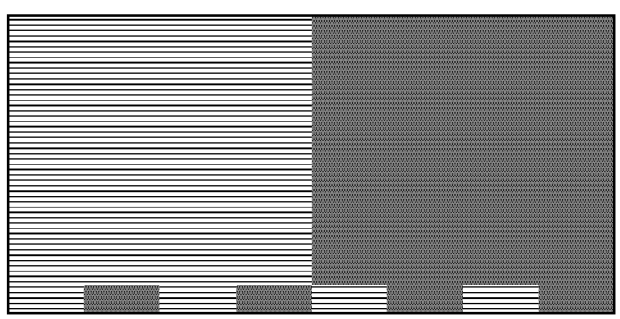
FIG. 31 is a view showing a display image at a time point t83 (refer to FIG. 28) in the conventional example (first method).
Figure 32:
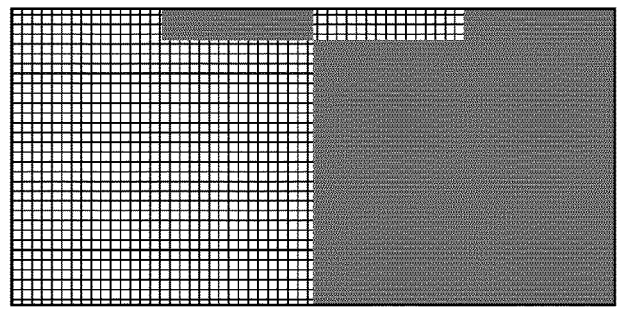
FIG. 32 is a view showing a display image at a time point t84 (refer to FIG. 28) in the conventional example (first method).
Figure 33:
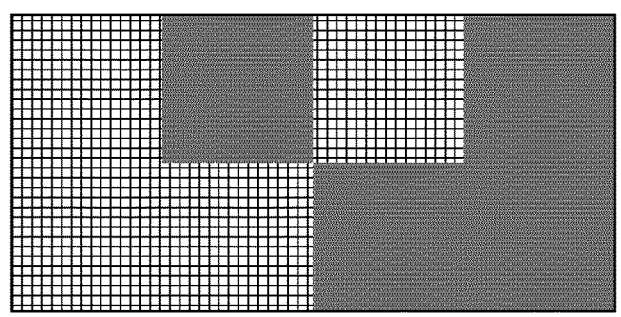
FIG. 33 is a view showing a display image at a time point t85 (refer to FIG. 28) in the conventional example (first method).
Figure 34:
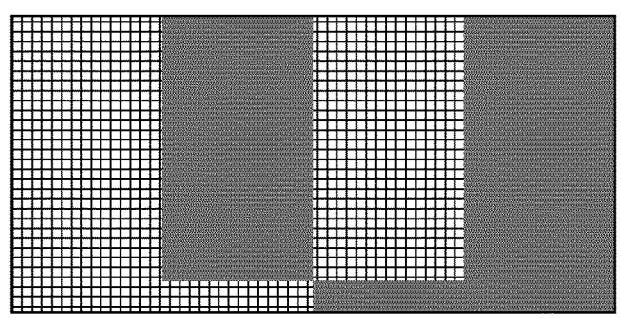
FIG. 34 is a view showing a display image at a time point t86 (refer to FIG. 28) in the conventional example (first method).
Figure 35:
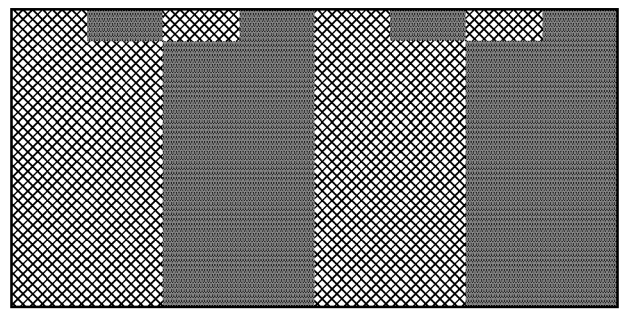
FIG. 35 is a view showing a display image at a time point t87 (refer to FIG. 28) in the conventional example (first method).
Figure 36:
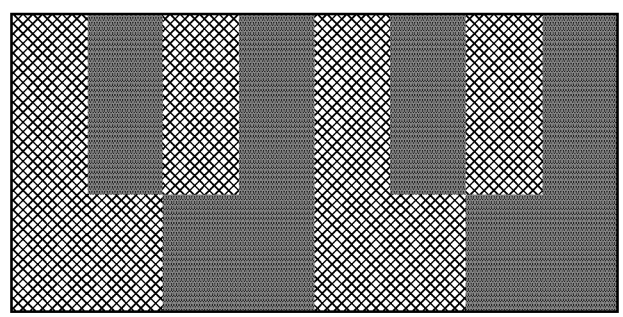
FIG. 36 is a view showing a display image at a time point t88 (refer to FIG. 28) in the conventional example (first method).
Figure 37:
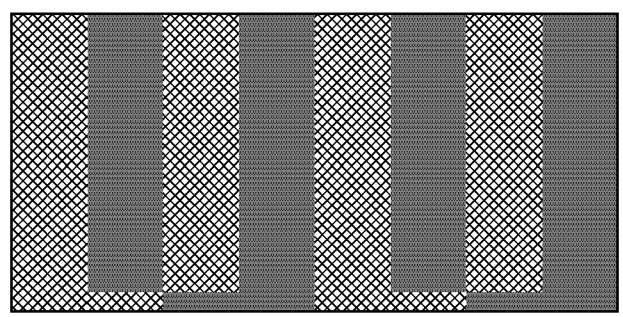
FIG. 37 is a view showing a display image at a time point t89 (refer to FIG. 28) in the conventional example (first method).
Figure 38:
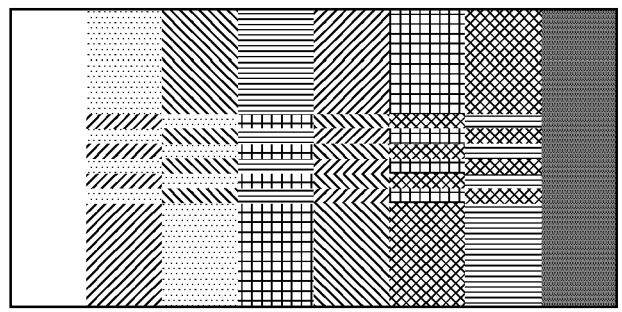
FIG. 38 is a view showing an image viewed by human eyes in the conventional example (first method).
Figure 39:
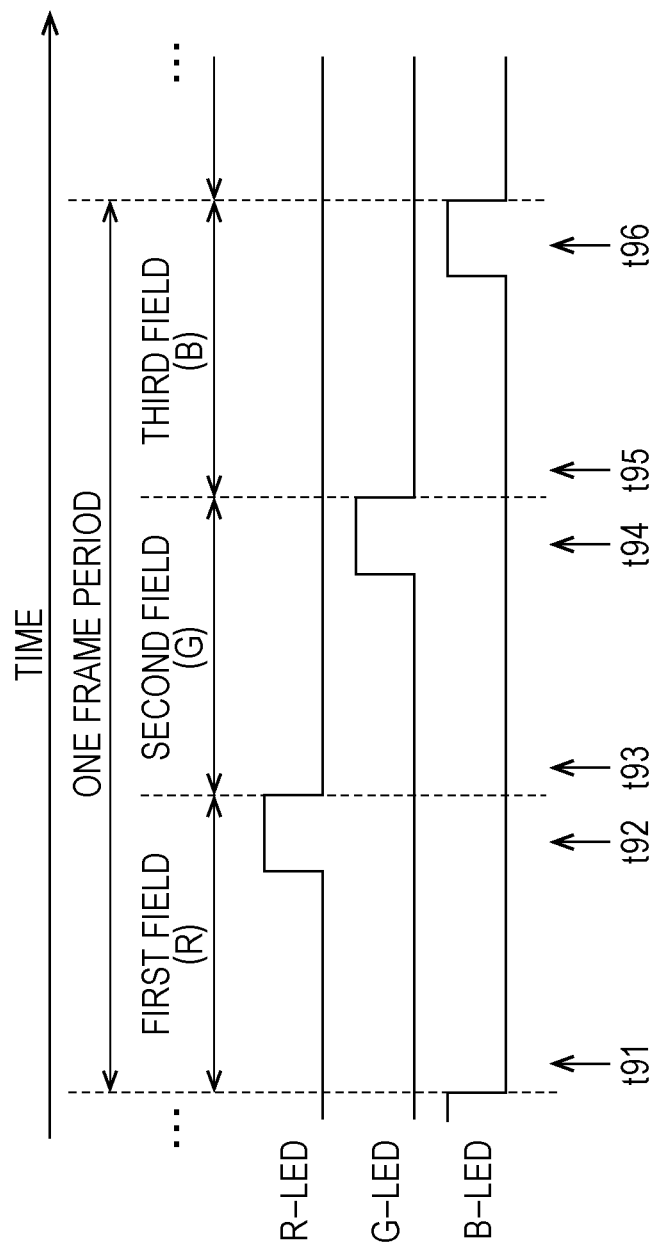
FIG. 39 is a view showing a configuration of one frame period in a conventional example (second method).
Figure 40:
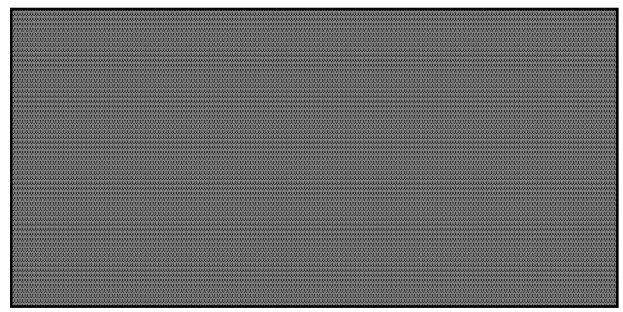
FIG. 40 is a view showing a display image at a time point t91, a time point t93 and a time point t95 (refer to FIG. 39) in the conventional example (second method).
Figure 41:
FIG. 41 is a view showing a display image at a time point t92 (refer to FIG. 39) in the conventional example (second method).
Figure 42:
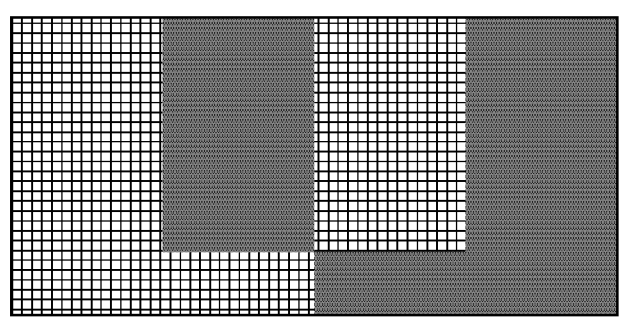
FIG. 42 is a view showing a display image at a time point t94 (refer to FIG. 39) in the conventional example (second method).
Figure 43:
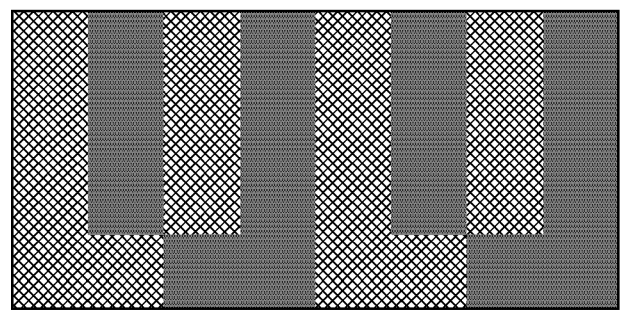
FIG. 43 is a view showing a display image at a time point t96 (refer to FIG. 39) in the conventional example (second method).
Figure 44:
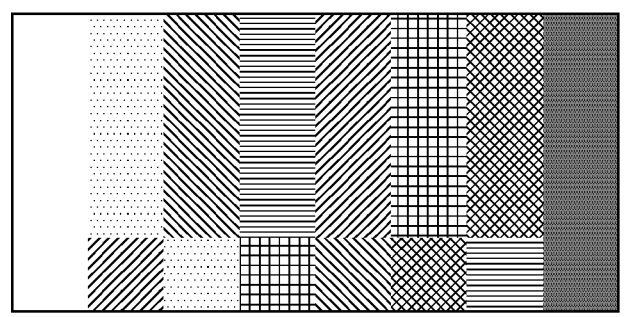
FIG. 44 is a view showing an image viewed by human eyes in the conventional example (second method).
Figure 45:
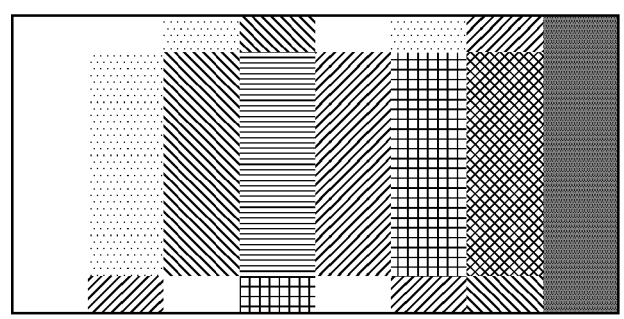
FIG. 45 is a view showing an image viewed by human eyes in the conventional example (third method).

FIG. 27 is a view for explaining the light emission period of each LED in the present embodiment. In the present embodiment, as shown in FIG. 27, when a screen of a color corresponding to each field is displayed, the lower-side objective LEDs are turned into the light emission state after the upper-side objective LEDs are turned into the light emission state, and the lower-side objective LEDs are turned into the light-off state after the upper-side objective LEDs are turned into the light-off state. In this manner, in the present embodiment as well, the LED driver 500 turns the upper-side objective LEDs into the light emission state at a timing of the tu(s) obtained by the formula (1), turns the upper-side objective LEDs into the light-off state at a timing of the tu(e) obtained by the formula (2), turns the lower-side objective LEDs into the light emission state at a timing of the td(s) obtained by the formula (3), and turns the lower-side objective LEDs into the light-off state at a timing of the td(e) obtained by the formula (4) with a start time point of the focused field as a reference.

When the liquid crystal response time res is 2 milliseconds, the state of each LED is controlled as follows for displaying an image for one frame. First, the upper-side R-LED and the upper-side G-LED are turned into the light emission state after 4.78 milliseconds from a start time point of the first field, the lower-side R-LED and the lower-side G-LED are turned into the light emission state at a start time point of the second field, the upper-side R-LED and the upper-side G-LED are turned into the light-off state after 0.61 millisecond from the start time point of the second field, and the lower-side R-LED and the lower-side G-LED are turned into the light-off state after 1.39 milliseconds from the start time point of the second field. Thereafter, the upper-side G-LED and the upper-side B-LED are turned into the light emission state after 4.78 milliseconds from the start time point of the second field, the lower-side G-LED and the lower-side B-LED are turned into the light emission state at a start time point of the third field, the upper-side G-LED and the upper-side B-LED are turned into the light-off state after 0.61 millisecond from the start time point of the third field, and the lower-side G-LED and the lower-side B-LED are turned into the light-off state after 1.39 milliseconds from the start time point of the third field. Further, the upper-side R-LED and the upper-side B-LED are turned into the light emission state after 4.78 milliseconds from the start time point of the third field, the lower-side R-LED and the lower-side B-LED are turned into the light emission state at a start time point of a first field of a next frame, the upper-side R-LED and the upper-side B-LED are turned into the light-off state after 0.61 millisecond from the start time point of this first field, and the lower-side R-LED and the lower-side B-LED are turned into the light-off state after 1.39 milliseconds from the start time point of this first field.

<3.4 Effect>

According to the present embodiment, LEDs of a plurality of colors are turned into the light emission state in each field. Therefore, in addition to the effect same as that of the first embodiment, an effect that it is possible to suppress occurrence of color breakup effectively when a moving image is displayed is achieved.

<4. Others>

The present invention is not limited to each of the embodiments, but may be modified in various manners within the scope of present invention. For example, a configuration of one frame period is not limited to the configuration in each of the embodiments. Further, for example, an area which is regarded as the low-luminance area is not limited to the area where the intensity of the light output from the light guide plate to the liquid crystal panel 800 is 15% or less. Furthermore, for example, the second embodiment provides the configuration in which all of the red color LED, the green color LED and the blue color LED are turned into the light emission state to thereby output white color light, but may provide a configuration in which a white color LED is included. In addition, as to the third embodiment, a field in which the LED of only one color is turned into the light emission state may be included.

(Additional Remarks)

As the liquid crystal display device and the driving method thereof according to the present invention, following configurations are considered.

(Additional Remark 1)

A liquid crystal display device, comprising a liquid crystal panel 800 in which a plurality of video signal lines SL and a plurality of scanning signal lines GL are disposed and which is capable of displaying an image while keeping a background in a transparent state; a liquid crystal panel driving unit (a source driver 300 and a gate driver 400) that drives the plurality of video signal lines SL and the plurality of scanning signal lines GL; a backlight 700 composed of a plurality of light sources including light sources of K colors (K is an integer of 3 or more) provided on a back face side of the liquid crystal panel 800; and a backlight driving unit 500 that drives the backlight 700, for performing display of a color image by dividing one frame period into a plurality of fields and displaying a screen of a different color for each field, in which when one side part and the other side part of the liquid crystal panel 800 in a direction in which the plurality of video signal lines SL extend are defined as a first side part and a second side part, respectively, the backlight 700 has a first light source group 71U including the light sources of the K colors, which are provided in a vicinity of the first side part among the plurality of light sources, a second light source group 71D including the light sources of the K colors, which are provided in a vicinity of the second side part among the plurality of light sources, a first light guide plate 72U that is configured so that luminance of the liquid crystal panel 800 becomes low gradually as being close to the second side part from the first side part when all light sources included in the first light source group 71U are turned into a light emission state, for guiding light emitted from the light sources included in the first light source group 71U to the liquid crystal panel 800, and a second light guide plate 72D that is configured so that the luminance of the liquid crystal panel 800 becomes low gradually as being close to the first side part from the second side part when all light sources included in the second light source group 71D are turned into the light emission state, for guiding light emitted from the light sources included in the second light source group 71D to the liquid crystal panel 800, the liquid crystal panel driving unit (the source driver 300 and the gate driver 400) drives the plurality of scanning signal lines GL one by one sequentially from a scanning signal line GL disposed at a most proximate position to the first side part to a scanning signal line GL disposed at a most proximate position to the second side part, and the backlight driving unit 500, when displaying a screen of a color corresponding to each field, turns a light source included in the first light source group 71U into the light emission state and then turns a light source included in the second light source group 71D into the light emission state, and turns the light source included in the first light source group 71U into a light-off state and then turns the light source included in the second light source group 71D into the light-off state.

With such a configuration, in a liquid crystal display device which adopts field-sequential driving, the backlight is provided with the light sources of the K colors provided in both of upper and lower sides of the liquid crystal panel 800 (one side in a direction in which the video signal lines SL extend is set as the upper side and the other side is set as the lower side), the first light guide plate 72U that guides emission light from light sources 71U provided in the upper side of the liquid crystal panel 800 (hereinafter, referred to as "upper-side light sources") to the liquid crystal panel 800, and the second light guide plate 72D that guides emission light from light sources 71D provided in the lower side of the liquid crystal panel 800 (hereinafter, referred to as a "lower-side light sources") to the liquid crystal panel 800. In such a configuration, for displaying a screen of a color corresponding to each field, first, the upper-side light sources 71U are turned into the light emission state and the lower-side light sources 71D are then turned into the light emission state. Here, the first light guide plate 72U is configured so that luminance becomes low gradually as being close to a lower part of the panel from an upper part of the panel when the upper-side light sources 71U are turned into the light emission state, and the second light guide plate 72D is configured so that luminance becomes low gradually as being close to the upper part of the panel from the lower part of the panel when the lower-side light sources 71D are turned into the light emission state. Thus, it becomes possible to make the upper part of the panel and the lower part of the panel bright sequentially. That is, it becomes possible to perform backlight scanning in a pseudo manner. Further, as described above, the light sources are provided in both of upper and lower sides of the liquid crystal panel 800 and a constituent element such as a reflection wall does not need to be provided in the liquid crystal panel 800. Thus, it is possible to make the display unit 600 of the liquid crystal panel 800 transparent. Accordingly, it is possible to perform field-sequential driving without causing color mixing in the liquid crystal display device capable of displaying an image while keeping a background in a transparent state.

(Additional Remark 2)

The liquid crystal display device according to the additional remark 1, in which when an arbitrary field of the plurality of fields is defined as a focused field and a light source that is to be turned into the light emission state for displaying a screen of a color corresponding to the focused field is defined as an objective light source, the backlight driving unit 500 turns the objective light source included in the first light source group 71U into the light emission state at a timing of tu-s obtained by a following formula (A), turns the objective light source included in the first light source group 71U into the light-off state at a timing of tu-e obtained by a following formula (B), turns the objective light source included in the second light source group 71D into the light emission state at a timing of td-s obtained by a following formula (C), and turns the objective light source included in the second light source group 71D into the light-off state at a timing of td-e obtained by a following formula (D), with a start time point of the focused field as a reference:

$$tu(s)=f-fa+res-ft \quad (A)$$

$$tu(e)=f-fa+res \quad (B)$$

$$td(s)=f+fa-ft \quad (C)$$

$$td(e)=f+fa \quad (D)$$

in which, f represents a length of one field period, ft represents a length of a light emission period of each light source, fa represents a time required to drive the scanning signal line GL included in a low-luminance area having predetermined luminance or less when all light sources included in either the first light source group 71U or the second light source group 71D are turned into the light emission state, and res represents a time required for a liquid crystal to respond sufficiently.

With such a configuration, by considering the length of the light emission period of each light source, the time required to drive the scanning signal line GL in the low-luminance area (the area having predetermined luminance or less when all the light sources included in either the upper-side light sources 71U or the lower-side light sources 71D are turned into the light emission state), and the liquid crystal response time, a light emission timing and a light-off timing for the upper-side light sources 71U, and a light emission timing and a light-off timing for the lower-side light sources 71D are determined. Therefore, in the liquid crystal display device capable of displaying an image while keeping a background in a transparent state, it is possible to perform field-sequential driving while preventing occurrence of color mixing more reliably.

(Additional Remark 3)

The liquid crystal display device according to the additional remark 2, wherein when the res is larger than the fa, the backlight driving unit 500 turns the objective light source included in the second light source group 71D into the light emission state at a timing of td-s obtained by a following formula (E) and turns the objective light source included in the second light source group 71D into the light-off state at a timing of td-e obtained by a following formula (F), with the start time point of the focused field as the reference:

$$td(s)=f+res-ft \qquad (E)$$

$$td(e)=f+res \qquad (F).$$

With such a configuration, the lower-side light sources 71D are kept in the light emission state until the liquid crystal is turned into a sufficiently responding state in a pixel of a lowest part of the liquid crystal panel 800. Therefore, luminance and contrast in the lower part of the liquid crystal panel 800 become excellent.

(Additional Remark 4)

The liquid crystal display device according to the additional remark 2, wherein the fa is f/4.

With such a configuration, in the same manner as the configuration according to the additional remark 2, in the liquid crystal display device capable of displaying an image while keeping a background in a transparent state, it is possible to perform field-sequential driving while preventing occurrence of color mixing more reliably.

(Additional Remark 5)

The liquid crystal display device according to the additional remark 2, wherein the low-luminance area is an area in which the luminance becomes 15% or less of maximum luminance when all the light sources included in either the first light source group 71U or the second light source group 71D are turned into the light emission state.

With such a configuration, in the same manner as the configuration according to the additional remark 2, in the liquid crystal display device capable of displaying an image while keeping a background in a transparent state, it is possible to perform field-sequential driving while preventing occurrence of color mixing more reliably.

(Additional Remark 6)

The liquid crystal display device according to the additional remark 2, wherein the ft is f/4.

With such a configuration, in the same manner as the configuration according to the additional remark 2, in the liquid crystal display device capable of displaying an image while keeping a background in a transparent state, it is possible to perform field-sequential driving while preventing occurrence of color mixing more reliably.

(Additional Remark 7)

The liquid crystal display device according to the additional remark 1, wherein the first light guide plate 72U and the second light guide plate 72D are configured so that the luminance becomes uniform over the entire liquid crystal panel 800 when all the light sources included in the first light source group 71U and all the light sources included in the second light source group 71D are turned into the light emission state.

With such a configuration, in the liquid crystal display device capable of displaying an image while keeping a background in a transparent state, it is possible to perform field-sequential driving without causing luminance non-uniformity or color mixing.

(Additional Remark 8)

The liquid crystal display device according to the additional remark 1, wherein the first light guide plate 72U contains a plurality of light diffusion particles 73 having different refractive indexes so that the luminance of the liquid crystal panel 800 becomes low gradually as being close to the second side part from the first side part when all the light sources included in the first light source group 71U are turned into the light emission state, and the second light guide plate 72D contains a plurality of light diffusion particles 73 having different refractive indexes so that the luminance of the liquid crystal panel 800 becomes low gradually as being close to the first side part from the second side part when all the light sources included in the second light source group 71D are turned into the light emission state.

With such a configuration, by configuring the light guide plates 72U and 72D to contain the plurality of light diffusion particles 73 having different refractive indexes, it is possible to perform field-sequential driving without causing color mixing in the liquid crystal display device capable of displaying an image while keeping a background in a transparent state.

(Additional Remark 9)

The liquid crystal display device according to the additional remark 1, wherein the light sources of the K colors are light sources of three colors composed of a red color light source, a green color light source and a blue color light source.

With such a configuration, an effect same as that of the configuration according to the additional remark 1 is achieved by using general light sources.

(Additional Remark 10)

The liquid crystal display device according to the additional remark 9, wherein one frame period is configured by three fields composed of a field corresponding to a red color screen, a field corresponding to a green color screen and a field corresponding to a blue color screen, and the backlight driving unit 500 turns the red color light source into the light emission state when the red color screen is displayed, turns the green color light source into the light emission state when the green color screen is displayed, and turns the blue color light source into the light emission state when the blue color screen is displayed.

With such a configuration, the effect same as that of the configuration according to the additional remark 1 is achieved by a general configuration of one frame period.

(Additional Remark 11)

The liquid crystal display device according to the additional remark 9, wherein one frame period is configured by four fields composed of a field corresponding to a red color screen, a field corresponding to a green color screen, a field corresponding to a blue color screen and a field corresponding to a white color screen, and the backlight driving unit turns the red color light source into the light emission state when the red color screen is displayed, turns the green color light source into the light emission state when the green color screen is displayed, turns the blue color light source into the light emission state when the blue color screen is displayed, and turns the red color light source, the green color light source and the blue color light source into the light emission state when the white color screen is displayed.

With such a configuration, one frame period is configured by the three fields corresponding to screens of respective colors of three primary colors and the field corresponding to the white color screen. Further, for example, after the red color light source, the green color light source and the blue color light source are turned into the light emission state sequentially, the light sources of all these colors are turned into the light emission state. Therefore, in addition to the effect same as that of the configuration according to the additional remark 1, an effect that it is possible to suppress occurrence of color breakup when a moving image is displayed is achieved.

(Additional remark 12)

The liquid crystal display device according to the additional remark 1, wherein the backlight driving unit 500 turns light sources of a plurality of colors into the light emission state in each field for displaying a screen of a color corresponding to each field.

With such a configuration, the light sources of the plurality of colors are turned into the light emission state in each field constituting one frame period. Therefore, in addition to the effect same as that of the configuration according to the additional remark 1, an effect that it is possible to effectively suppress occurrence of color breakup when a moving image is displayed is achieved.

(Additional remark 13)

A method for driving a liquid crystal display device that includes a liquid crystal panel 800 in which a plurality of video signal lines SL and a plurality of scanning signal lines GL are disposed and which is capable of displaying an image while keeping a background in a transparent state and a backlight 700 composed of a plurality of light sources including light sources of K colors (K is an integer of 3 or more) provided on a back face side of the liquid crystal panel 800, and performs display of a color image by dividing one frame period into a plurality of fields and displaying a screen of a different color for each field, comprising:

a liquid crystal panel driving step of driving the plurality of video signal lines SL and the plurality of scanning signal lines GL, and a backlight driving step of driving the backlight 700, wherein when one side part and the other side part of the liquid crystal panel 800 in a direction in which the plurality of video signal lines SL extend are defined as a first side part and a second side part, respectively, the backlight 700 has a first light source group 71U including the light sources of the K colors, which are provided in a vicinity of the first side part among the plurality of light sources, a second light source group 71D including the light sources of the K colors, which are provided in a vicinity of the second side part among the plurality of light sources, a first light guide plate 72U that is configured so that luminance of the liquid crystal panel 800 becomes low gradually as being close to the second side part from the first side part when all light sources included in the first light source group 71U are turned into a light emission state, for guiding light emitted from a light source included in the first light source group 71U to the liquid crystal panel 800, and a second light guide plate 72D that is configured so that the luminance of the liquid crystal panel 800 becomes low gradually as being close to the first side part from the second side part when all light sources included in the second light source group 71D are turned into the light emission state, for guiding light emitted from a light source included in the second light source group 71D to the liquid crystal panel 800, at the liquid crystal panel driving step, the plurality of scanning signal lines GL are driven one by one sequentially from a scanning signal line GL disposed at a most proximate position to the first side part to a scanning signal line GL disposed at a most proximate position to the second side part, and at the backlight driving step, when displaying a screen of a color corresponding to each field, a light source included in the first light source group 71U is turned into the light emission state and then a light source included in the second light source group 71D is turned into the light emission state, and the light source included in the first light source group 71U is turned into a light-off state and then the light source included in the second light source group 71D is turned into the light-off state.

With such a configuration, the effect same as that of the configuration according to the additional remark 1 is able to be exerted in the method for driving the liquid crystal display device.

REFERENCE SIGNS LIST

71U(R), 71U(G), 71U(B) upper-side R-LED, upper-side G-LED, upper-side B-LED
71D(R), 71D(G), 71D(B) lower-side R-LED, lower-side G-LED, lower-side B-LED
72U upper-side light guide plate
72D lower-side light guide plate
73 light diffusion particle
100 frame rate conversion unit
200 signal processing circuit
300 source driver
400 gate driver
500 LED driver
600 display unit
700 backlight
800 liquid crystal panel
GL, GL1 to GLm gate bus line
SL, SL1 to SLn source bus line

The invention claimed is:

1. A liquid crystal display device, comprising a liquid crystal panel in which a plurality of video signal lines and a plurality of scanning signal lines are disposed and which is capable of displaying an image while keeping a background in a transparent state; a liquid crystal panel driving unit that drives the plurality of video signal lines and the plurality of scanning signal lines; a backlight composed of a plurality of light sources including light sources of K colors (K is an integer of 3 or more) provided on a back face side of the liquid crystal panel; and a backlight driving unit that drives the backlight, for performing display of a color image by dividing one frame period into a plurality of fields and displaying a screen of a different color for each field, wherein when one side part and the other side part of the liquid crystal panel in a direction in which the plurality of video signal lines extend are defined as a first side part and a second side part, respectively, the backlight has a first light source group including the light sources of the K colors, which are provided in a vicinity of the first side part among the plurality of light sources, a second light source group including the light sources of the K colors, which are provided in a vicinity of the second side part among the plurality of light sources, a first light guide plate that is configured so that luminance of the liquid crystal panel becomes low gradually as being close to the second side part from the first side part when all light sources included in the first light source group are turned into a light emission state, for guiding light emitted from the light sources included in the first light source group to the liquid crystal panel, and a second light guide plate that is configured so that the luminance of the liquid crystal panel becomes low gradually as being close to the first side part from the second side part when all light sources included in the second light source group are turned into the light emission state, for guiding light emitted from the light sources included in the second light source group to the liquid crystal panel, the liquid crystal panel driving unit drives the plurality of scanning signal lines one by one sequentially from a scanning signal line disposed at a most proximate position to the first side part to a scanning signal line disposed at a most proximate position to the second side part, and the backlight driving unit, when displaying a screen of a color corresponding to each field, turns a light source included in the first light source group into the light emission state and then turns a light source included in the second light source group into the light emission state, turns the light source included in the first light source group into a light-off state and then turns the light source included in the second light source group into the light-off state, and when an arbitrary field of the plurality of fields is defined as a focused field and a light source that is to be turned into the light emission state for displaying a screen of a color corresponding to the focused field is defined as an objective light source, the backlight driving unit turns the objective light source included in the first light source group into the light emission state at a timing of tu-s obtained by a following formula (A), turns the objective light source included in the first light source group into the light-off state at a timing of tu-e obtained by a following formula (B), turns the objective light source included in the second light source group into the light emission state at a timing of td-s obtained by a following formula (C), and turns the objective light source included in the second light source group into the light-off state at a timing of td-e obtained by a following formula (D), with a start time point of the focused field as a reference:

$$tu(s)=f-fa+res-ft \quad (A)$$

$$tu(e)=f-fa+res \quad (B)$$

$$td(s)=f+fa-ft \quad (C)$$

$$td(e)=f+fa \quad (D)$$

in which, f represents a length of one field period, ft represents a length of a light emission period of each light source, fa represents a time required to drive the scanning signal line included in a low-luminance area having predetermined luminance or less when all light sources included in a low-luminance area having pre- determined luminance or less when all light turned into the light emission state, and res represents a time required for a liquid crystal to respond sufficiently.

2. The liquid crystal display device according to claim 1, wherein when the res is larger than the fa, the backlight driving unit turns the objective light source included in the second light source group into the light emission state at a timing of td-s obtained by a following formula (E) and turns the objective light source included in the second light source group into the light-off state at a timing of td-e obtained by a following formula (F) with the start time point of the focused field as the reference:

$$td(s)=f+res-ft \quad (E)$$

$$td(e)=f+res \quad (F).$$

3. The liquid crystal display device according to claim 1, wherein the fa is f/4.

4. The liquid crystal display device according to claim 1, wherein the low-luminance area is an area in which the luminance becomes 15% or less of maximum luminance when all the light sources included in either the first light source group or the second light source group are turned into the light emission state.

5. The liquid crystal display device according to claim 1, wherein the ft is f/4.

6. The liquid crystal display device according to claim 1, wherein the first light guide plate and the second light guide plate are configured so that the luminance becomes uniform over the entire liquid crystal panel when all the light sources included in the first light source group and all the light sources included in the second light source group are turned into the light emission state.

7. The liquid crystal display device according to claim 1, wherein the first light guide plate contains a plurality of light diffusion particles having different refractive indexes so that the luminance of the liquid crystal panel becomes low gradually as being close to the second side part from the first side part when all the light sources included in the first light source group are turned into the light emission state, and the second light guide plate contains a plurality of light diffusion particles having different refractive indexes so that the luminance of the liquid crystal panel becomes low gradually as being close to the first side part from the second side part when all the light sources included in the second light source group are turned into the light emission state.

8. The liquid crystal display device according to claim 1, wherein the light sources of the K colors are light sources of three colors composed of a red color light source, a green color light source and a blue color light source.

9. The liquid crystal display device according to claim 8, wherein one frame period is configured by three fields composed of a field corresponding to a red color screen, a field corresponding to a green color screen and a field corresponding to a blue color screen, and the backlight driving unit turns the red color light source into the light emission state when the red color screen is displayed, turns the green color light source into the light emission state when the green color screen is displayed, and turns the blue color light source into the light emission state when the blue color screen is displayed.

10. The liquid crystal display device according to claim 8, wherein
one frame period is configured by four fields composed of a field corresponding to a red color screen, a field corresponding to a green color screen, a field corresponding to a blue color screen and a field corresponding to a white color screen, and
the backlight driving unit
turns the red color light source into the light emission state when the red color screen is displayed,
turns the green color light source into the light emission state when the green color screen is displayed,
turns the blue color light source into the light emission state when the blue color screen is displayed, and
turns the red color light source, the green color light source and the blue color light source into the light emission state when the white color screen is displayed.

11. The liquid crystal display device according to claim 1, wherein the backlight driving unit turns light sources of a plurality of colors into the light emission state in each field for displaying a screen of a color corresponding to each field.

12. A method for driving a liquid crystal display device that includes a liquid crystal panel in which a plurality of video signal lines and a plurality of scanning signal lines are disposed and which is capable of displaying an image while keeping a background in a transparent state and a backlight composed of a plurality of light sources including light sources of K colors (K is an integer of 3 or more) provided on a back face side of the liquid crystal panel, and performs display of a color image by dividing one frame period into a plurality of fields and displaying a screen of a different color for each field, comprising:

a liquid crystal panel driving step of driving the plurality of video signal lines and the plurality of scanning signal lines, and a backlight driving step of driving the backlight, wherein when one side part and the other side part of the liquid crystal panel in a direction in which the plurality of video signal lines extend are defined as a first side part and a second side part, respectively, the backlight has a first light source group including the light sources of the K colors, which are provided in a vicinity of the first side part among the plurality of light sources, a second light source group including the light sources of the K colors, which are provided in a vicinity of the second side part among the plurality of light sources, a first light guide plate that is configured so that luminance of the liquid crystal panel becomes low gradually as being close to the second side part from the first side part when all light sources included in the first light source group are turned into the light emission state, for guiding light emitted from the light sources included in the first light source group to the liquid crystal panel, and a second light guide plate that is configured so that the luminance of the liquid crystal panel becomes low gradually as being close to the first side part from the second side part when all the light sources included in the second light source group are turned into the light emission state, for guiding light emitted from the light sources included in the second light source group to the liquid crystal panel, wherein at the liquid crystal panel driving step, the plurality of scanning signal lines are driven one by one sequentially from a scanning signal line disposed at a most proximate position to the first side part to a scanning signal line disposed at a most proximate position to the second side part, and at the backlight driving step, when displaying a screen of a color corresponding to each field, a light source included in the first light source group is turned into the light emission state and then a light source included in the second light source group is turned into the light emission state, the light source included in the first light source group is turned into a light-off state and then the light source included in the second light source group is turned into the light-off state, and when an arbitrary field of the plurality of fields is defined as a focused field and a light source that is to be turned into the light emission state for displaying a screen of a color corresponding to the focused field is defined as an objective light source, the backlight driving unit turns the objective light source included in the first light source group into the light emission state at a timing of tu-s obtained by following formula(A), turns the objective light source included in the first light source group into the light-off state at a timing of tu-e obtained by a following formula (B), turns the objective light source included in the second light source group into the light emission state at a timing of the td-s obtained by following formula (C), and turns the objective light source included in the second light source group into the light-off state at a timing of td-e obtained by a following formula (D), with a start time point of the focused field as a reference:

$$tu(s)=f-fa+res-ft \quad (A)$$

$$tu(e)=f-fa+res \quad (B)$$

$$td(s)=f+fa-ft \quad (C)$$

$$td(e)=f+fa \quad (D)$$

in which, f represents a length of one field period, ft represents a length of a light emission period of each light source, fa represents a time required to drive the scanning signal line included in a low-luminance area having predetermined luminance or less when all light sources included in either the first light source group or the second light source group are turned into the light emission state, and res represents a time required for a liquid crystal to respond sufficiently.

* * * * *